US00RE41577E

(19) United States
(12) Reissued Patent
McLean

(10) Patent Number: US RE41,577 E
(45) Date of Reissued Patent: Aug. 24, 2010

(54) HIGH POWER DENSITY FUEL CELL STACK USING MICRO STRUCTURED COMPONENTS

(75) Inventor: Gerard Francis McLean, West Vancouver (CA)

(73) Assignee: Angstrom Power Incorporated, North Vancouver (CA)

(21) Appl. No.: 11/998,436

(22) Filed: Nov. 29, 2007

Related U.S. Patent Documents

Reissue of:
(64) Patent No.: 6,969,563
Issued: Nov. 29, 2005
Appl. No.: 10/349,133
Filed: Jan. 22, 2003

U.S. Applications:
(60) Provisional application No. 60/360,638, filed on Mar. 1, 2002.

(51) Int. Cl.
*H01M 8/02* (2006.01)
*H01M 8/24* (2006.01)

(52) U.S. Cl. ..... 429/35; 429/32; 429/38
(58) Field of Classification Search ..... 429/32, 429/35, 36, 38, 39
See application file for complete search history.

(56) References Cited

U.S. PATENT DOCUMENTS

| | | | |
|---|---|---|---|
| 3,451,853 | A | 6/1969 | Spahrbier |
| 4,037,023 | A | 7/1977 | Grehier et al. |
| 4,125,676 | A | 11/1978 | Maricle et al. |
| 4,414,294 | A | 11/1983 | Guthrie |
| 5,252,410 | A | 10/1993 | Wilkinson et al. |
| 5,316,643 | A | 5/1994 | Ahn et al. |
| 5,480,738 | A | 1/1996 | Elangovan et al. |
| 5,631,099 | A | 5/1997 | Hockaday |
| 5,672,439 | A | 9/1997 | Wilkinson et al. |
| 5,703,961 | A | 12/1997 | Rogina et al. |
| 5,759,712 | A | 6/1998 | Hockaday |

(Continued)

FOREIGN PATENT DOCUMENTS

| | | |
|---|---|---|
| EP | 0585049 | 8/1993 |
| EP | 0585049 A1 | 3/1994 |
| EP | 0823743 | 8/1997 |
| EP | 0823743 A2 | 2/1998 |
| GB | 2339058 | 1/2000 |

(Continued)

OTHER PUBLICATIONS

Wainwright, J. S., et al., "A Microfabricated Hydrogen/Air Fuel Cell", *Meeting Abstracts, 195th Meeting of the Electrochemical Society, vol. 99–1,* (Abstract No. 571) (May 2–6, 1999, Seattle, WA) (1999), 3 pgs.

(Continued)

*Primary Examiner*—Stephen J. Kalafut
(74) *Attorney, Agent, or Firm*—Schwegman, Lundberg & Woessner, P.A.

(57) ABSTRACT

The invention is a multiple fuel cell layer structure with numerous fuel cell layers, each fuel cell has an anode, a cathode, a positive end and a negative end, wherein a first fuel cell layer is stacked on top of a second fuel cell layer such that the anode side of the first fuel cell and the anode side of the second fuel cell adjoin, additional fuel cell layers can then be added in a like manner, at least one seal disposed between the adjacent fuel cell layers forming at least one plenum, and a positive and a negative connector is connected to the stack to an outside load such that when fuel is presented to the anode sides of the fuel cell layers and oxidant is presented to the cathode sides of the fuel cell layers current is produced to drive the outside load.

63 Claims, 21 Drawing Sheets

U.S. PATENT DOCUMENTS

| | | | | |
|---|---|---|---|---|
| 5,861,221 | A | 1/1999 | Ledjeff et al. | |
| 5,863,672 | A | 1/1999 | Ledjeff et al. | |
| 5,925,477 | A | 7/1999 | Ledjeff et al. | |
| 5,952,188 | A | 9/1999 | Kumar et al. | |
| 5,989,741 | A | 11/1999 | Bloomfield et al. | |
| 6,024,848 | A | 2/2000 | Dufner et al. | |
| 6,060,188 | A | 5/2000 | Muthuswamy et al. | |
| 6,127,058 | A | 10/2000 | Pratt et al. | |
| 6,194,095 | B1 | 2/2001 | Hockaday | |
| 6,312,846 | B1 | 11/2001 | Marsh | |
| 6,680,139 | B2 | 1/2004 | Narayanan et al. | |
| 6,686,079 | B2 | 2/2004 | Zhang et al. | |
| 6,696,195 | B2 * | 2/2004 | Pavio et al. | 429/38 |
| 6,713,206 | B2 | 3/2004 | Markoski et al. | |
| 6,727,016 | B2 | 4/2004 | Bostaph et al. | |
| 6,864,010 | B1 | 3/2005 | McLean | |
| 6,872,287 | B1 | 3/2005 | McLean | |
| 6,969,563 | B1 | 11/2005 | McLean | |
| 6,989,215 | B1 | 1/2006 | McLean | |
| 7,150,933 | B1 | 12/2006 | McLean | |
| 2002/0094471 | A1 | 7/2002 | Mercuri | |
| 2003/0138685 | A1 | 7/2003 | Jankowski et al. | |

FOREIGN PATENT DOCUMENTS

| | | | |
|---|---|---|---|
| JP | 8050903 | | 2/1996 |
| WO | WO 01/95406 | | 12/2001 |
| WO | WO-01/95406 | A2 | 12/2001 |
| WO | WO 02/067345 | | 8/2002 |
| WO | WO-02/067345 | A2 | 8/2002 |
| WO | WO-02/099917 | A2 | 12/2002 |
| WO | WO 02/099917 | | 12/2002 |

OTHER PUBLICATIONS

"U.S. Appl. No. 10/349,133, Amendment and Response filed Apr. 29, 2005 to Non–Final Office Action mailed Mar. 22, 2005", 15 pgs.

"U.S. Appl. No. 10/349,133, Interview Summary mailed May 4, 2005", 15 pgs.

"U.S. Appl. No. 10/349,133, Non–Final Office Action mailed Mar. 22, 2005", 7 pgs.

"U.S. Appl. No. 10/349,133, Notice of Allowance mailed Jul. 26, 2005", 4 pgs.

"International Application Ser. No. PCT/IB03/00915 International Search Report mailed Oct. 22, 2004", 3 pgs.

* cited by examiner

HIGH POWER DENSITY FUEL CELL STACK USING MICRO STRUCTURED COMPONENTS

Matter enclosed in heavy brackets [ ] appears in the original patent but forms no part of this reissue specification; matter printed in italics indicates the additions made by reissue.

BACKGROUND OF THE INVENTION

The application herein claims priority from the provisional Patent Application 60/360,638 with a filing date of Mar. 1, 2002.

FIELD OF THE INVENTION

The present invention relates to fuel cells. More specifically the invention relates to methods of combining separate fuel cell layers to form a fuel cell layer structure.

High power density fuel cells have long been desired.

Existing fuel cells generally are a stacked assembly of individual fuel cells, with each cell producing high current at low voltage. The typical cell construction involves reactant distribution and current collection devices brought into contact with a layered electrochemical assembly consisting of a gas diffusion layer, a first catalyst layer, an electrolyte layer, a second catalyst layer and a second gas diffusion layer. With the exception of high temperature fuel cells, such as molten carbonate cells, most proton exchange membrane, direct methanol, solid oxide or alkaline fuel cells have a layered planar structure where the layers are first formed as distinct components and then assembled into a functional fuel cell stack by placing the layers in contact with each other.

One major problem with the layered planar structure fuel cell has been that the layers must be held in intimate electrical contact with each other, which if intimate contact does not occur the internal resistance of the stack increases, which decreases the overall efficiency of the fuel cell.

A second problem with the layered planar structured fuel cell has been to maintain consistent contact between the layers for sealing and ensuring correct flows of reactants and coolants in the inner recesses of the layer structured fuel cell. Also if the overall area of the cell becomes too large then there are difficulties creating the contacting forces needed to maintain the correct fluid flow distribution of reactant gases over the electrolyte surface.

Existing devices also have the feature that, with the layered planar structure fuel cell since both fuel and oxidant are required to flow within the plane of the layered planar structured fuel cell, at least 4 and up to 10 but typically 8 distinct layers have been required to form a workable cell, typically a first flowfield, a first gas diffusion layer, a first catalyst layer, a first electrolyte layer, a second catalyst layer, a second gas diffusion layer, a second flowfield layer and a separator. These layers are usually manufactured into separate fuel cell components and then the layers are brought into contact with each other to form a fuel cell stack. When contacting the layers care must be taken to allow gas diffusion within the layers while preventing gas leaking from the assembled fuel cell stack. Furthermore, all electrical current produced by the fuel cells in the stack must pass through each layer in the stack, relying on the simple contacting of distinct layers to provide an electrically conductive path. As a result, both sealing and conductivity require the assembled stack to be clamped together with significant force in order to activate perimeter seals and reduce internal contact resistance.

The manufacture of the layers for existing fuel cell configurations is often expensive and difficult. The bipolar plates, which serve as oxidant and fuel flowfields as well as the separator are often constructed from graphite which is difficult to machine, adding significant cost to the fuel cell stack. The membrane electrode assembly (MEA) is usually constructed by first coating a solid polymer electrolyte with catalyst on either side and then pressing gas diffusion electrodes onto the electrolyte. The fuel cell assembly requires multiple individual bipolar plates and membrane electrode assemblies to be connected together in a serial manner. Usually discrete seals must be attached between neighbouring bipolar plates and membrane electrode assemblies and the whole stack of sealed bipolar and MEA layers must be held together under considerable compressive force.

A need has existed to develop alternative fuel cell designs that do not perpetuate the approach of assembling discrete layers in a serial manner. One way to meet this need is to build fuel cells using a micro-structured approach wherein micro-fabrication techniques and nano-structured materials can be combined to create novel devices not subject to the problems commonly associated with conventional fuel cell designs. The application of micro-scale techniques to fuel cells has a number of distinct advantages. Specifically, the potential for increased power density due to thinner layers and novel geometries, improved heat and mass transfer, improved and/or more precise catalyst utilization and reduced losses with shorter conductive path lengths will all make fuel cells more efficient and enable higher volumetric power densities. The opportunity to include ancillary systems into the fuel cell design and the potential for new applications to emerge present even more potential benefits.

A need has existed for a micro fuel cell capable of low cost manufacturing because of having fewer parts than the layered planar structure fuel cell.

A need has existed for a micro fuel cell having the ability to utilize a wide variety of electrolytes.

A need has existed for a micro fuel cell, which has substantially reduced contact resistance within the fuel cell.

A number of prior inventions have used microscale-manufacturing techniques with fuel cells. U.S. Pat. No. 5,861,221 presents a 'membrane strip' containing a number of conventional MEAs connected to each other in series by connecting the edge of the negative electrode of one MEA to the edge of the positive electrode of the next MEA. Two configurations are considered. The first constructs the 'membrane strip' by placing the MEAs together in a step-like configuration. The second constructs the 'membrane strip' by combining MEAs end-to-end with electrically conductive regions between them that connect the cells in series. In some follow-up work (U.S. Pat. No. 5,925,477) the same inventors incorporate a shunt between the electrodes to improve the electrical conductivity of the cell. The MEAs themselves are of conventional layered structure design, and the overall edge collected assembly continues to rely on conventional seals between neighbouring MEAs.

U.S. Pat. No. 5,631,099 and U.S. Pat. No. 5,759,721 use similar series connection concepts but apply a number of other micro-scale techniques to the fuel cell design. By doing so multiple fuel cells are formed within a single structure simultaneously. The fuel cells themselves still reside as layered planar devices mounted onto a carrier, with interconnection between neighbouring fuel cells requiring a penetration of the carrier layer. Most of the techniques discussed in these patents relate to the creation of methanol tolerant catalysts and the application of palladium layers to the catalyst to prevent methanol crossover within the cells.

WO 01/95406 describes a single membrane device that is segmented to create multiple MEA structures. Complex bipolar plates that are difficult to manufacture provide both fuel and oxidants to both sides of the MEA layer. U.S. Pat. No. 6,127,058 describes a similar structure, but instead of complex manifolding of reactant gases, only one reactant is supplied to either side of the MEA layer. Series interconnection of the fuel cells formed within the single MEA layer is achieved through external current collectors arranged around the perimeter of the device providing electrical connection from the top of the MEA layer to the bottom of the MEA layer. Such perimeter electrical connections are inefficient.

Some prior art fuel cells attempt to reduce size and fabrication costs by applying micro-fabrication techniques. For example the Case Western Reserve University device forms multiple fuel cells on a carrier substrate using thin layer processes similar to those used in printing and semiconductor fabrication (Wainwright et al. "A micro-fabricated Hydrogen/Air Fuel Cell" 195 Meeting of the Electrochemical Society, Seattle, Wash.; 1999). In these designs the fuel cells remain of conventional planar design, with the exception that the fuel cells are built-up to a base substrate. The cathodes must be formed on top of the planar electrolytes and then must be connected to neighbouring anodes with an explicit interconnect.

All the cells presented above use current collection on the edge of the electrode. This significantly increases the internal cell resistance of these cells. Each of these cells are also based on solid polymer electrolytes as this is the only electrolyte that allows for easy manufacture. Furthermore, all of the cells presented above achieve a micro fuel cell design by forming multiple fuel cells within a single electrolyte plane.

The concept of using non-planar electrolytes has been considered in the past. GB 2,339,058 presents a fuel cell with an undulating electrolyte layer. In this configuration a conventional layered MEA is constructed in an undulating fashion. This MEA is placed between bipolar plates. This design increases the active area that can be packed into a given volume. However, this design still relies on the expensive and complicated layered structure with explicit seals and requires compressive force to maintain internal electrical contact and sealing. JP 50903/1996 presents a solid polymer fuel cell having generally planar separators with alternating protruding parts serving to clamp a power generation element (apparently an MEA) into a non-planar but piecewise linear shape. As with GB 2,339,058, this document continues to rely on the expensive and complicated layered structure but this design also puts undue stress on the MEA by forcing it into a non-planar arrangement using the separator plates.

In addition to non-planar designs, some prior art presents tubular configurations. U.S. Pat. No. 6,060,188 presents a cylindrical fuel cell with a single MEA layer formed into a cylinder. Fuel or oxidant is delivered to the interior recess of the cylinder with the other reactant delivered on the exterior. Within this design, each cylindrical structure creates a single cell, with current flowing through the annular cylindrical wall that is the fuel cell. A method of providing series electrical interconnection between fuel cells or of sealing individual fuel cells is not disclosed. This design is reminescent of tubular designs for solid oxide fuel cells that are well known.

U.S. Pat. Nos. 5,252,410 and 4,037,023 and JP 6-3116369 present designs that form flow channels directly into the porous carbon gas diffusion electrode layers of the MEA. This approach does not get away from the essentially planar structure of the MEA or the flow field and separator plate but rather puts the gas distribution layer into the GDE rather than into the separator plate. Although this can decrease the cost the final structure is still a conventional layered structure fuel cell with a simple rearrangement of the layers. The ability to form flow fields into the fuel cell layer structure and create a fuel cell without the need for separator between layers is not discussed.

A need has existed to develop fuel cell topologies or fuel cell architectures that allow increased active areas to be included in the same volume, i.e. higher density of active areas. This will allow fuel cells to be optimized in a manner different than being pursued by most fuel cell developers today.

SUMMARY OF THE INVENTION

The present invention relates to methods of combining separate fuel cell layers to form a fuel cell layer structure. A number of features of the fuel cell layers are unique and allow for much simpler stacking structures.

More specifically, the present invention contemplates a multiple fuel cell structures with a plurality of fuel cell layers, each fuel cell layer comprising an anode side and a cathode side, a positive end and a negative end. The first fuel cell layer is stacked on top of a second fuel cell layer such that the anode side of the first fuel cell layer and the anode side of the second fuel cell layer adjoin. Additional fuel cells layers can then be disposed on the fuel cell layers in a like manner. The invention also has at least one seal disposed between the adjacent fuel cell layers forming at least one plenum and a positive connector and a negative connector for connecting the stack to the outside load. When fuel is presented to the anode sides of the plurality of fuel cell layers and oxidant is presented to the cathode sides of the plurality of fuel cell layers, a current is produced to drive the outside load.

In this embodiment optional formed flow fields can be created on the fuel cell layers. Alternately, the at least one plenum created by the at least one seal can be solid with a flow field. The plenum can also comprise a permeable material. The fuel cell layers of the multiple fuel cell structure can be connected in series, in parallel, or in combinations thereof between the positive and negative electrical connectors.

This configuration achieves the functionality of a conventional stack structure without the requirement for any explicit multi-function or bipolar separator plate to be inserted between discrete fuel cells or fuel cell layers resulting in an overall more space and material efficient design. Furthermore, since there is no current flow between neighbouring fuel cell layers the task of sealing and connecting the fuel cell layers into the stack is simplified considerably. Forming the flow fields on the surface of the fuel cell layers allows the reactant distribution flow paths to be formed without significantly decreasing the total reactive area of the fuel cell stack in comparison to an embodiment constructed without the formed flow fields.

The invention further contemplates a bi-level fuel cell layer structure comprising: a first fuel cell layer and a second fuel cell layer, each fuel cell layer comprising an anode side and a cathode side, a positive end and a negative end, and wherein the first fuel cell layer is stacked on top of the second fuel cell layer such that the anode side of the first fuel cell layer and the anode side of the second fuel cell layer adjoin forming a bi-level stack; a seal disposed between the first and second fuel cell layers forming a fuel plenum; a positive connector for connecting the bi-level stack to an outside load; and a negative connector for connecting the bi-level stack to the outside load; such that when fuel is introduced to the fuel plenum and the cathode sides are exposed to an oxidant, current is produced to drive the outside load.

The individual fuel cell layers in the bi-level fuel cell layer structure can be connected in either parallel or in series. The resulting structure is an enclosed plenum air breathing fuel cell that achieves a series electrical connection of the individual fuel cells in each fuel cell layer. Only fuel is required to be fed to the interior of the structure and electrical current flows within the two fuel cell layers independently of one another. There is no electrical connection between the two fuel cell layers except at the positive and negative electrical connections at either end of the fuel cell layers in the structure.

An optional solid material with a flow field can be disposed in the plenum created by the first and second fuel cell layers and the seal. The plenum could also comprise a permeable material or a hydrogen storage material. Alternately pressurized hydrogen or a liquid fuel could be stored within the plenum. It is also envisioned that the plenum be open to the ambient environment.

The fuel cell layers within the bi-level fuel cell structure can also comprise formed flow fields for the controlled delivery of reactant gases to the layers.

BRIEF DESCRIPTION OF THE FIGURES

A specific embodiment of the invention will be described by way of example with reference to the accompanying drawings, in which.

DETAILED DESCRIPTION OF INVENTION

Figure 1:
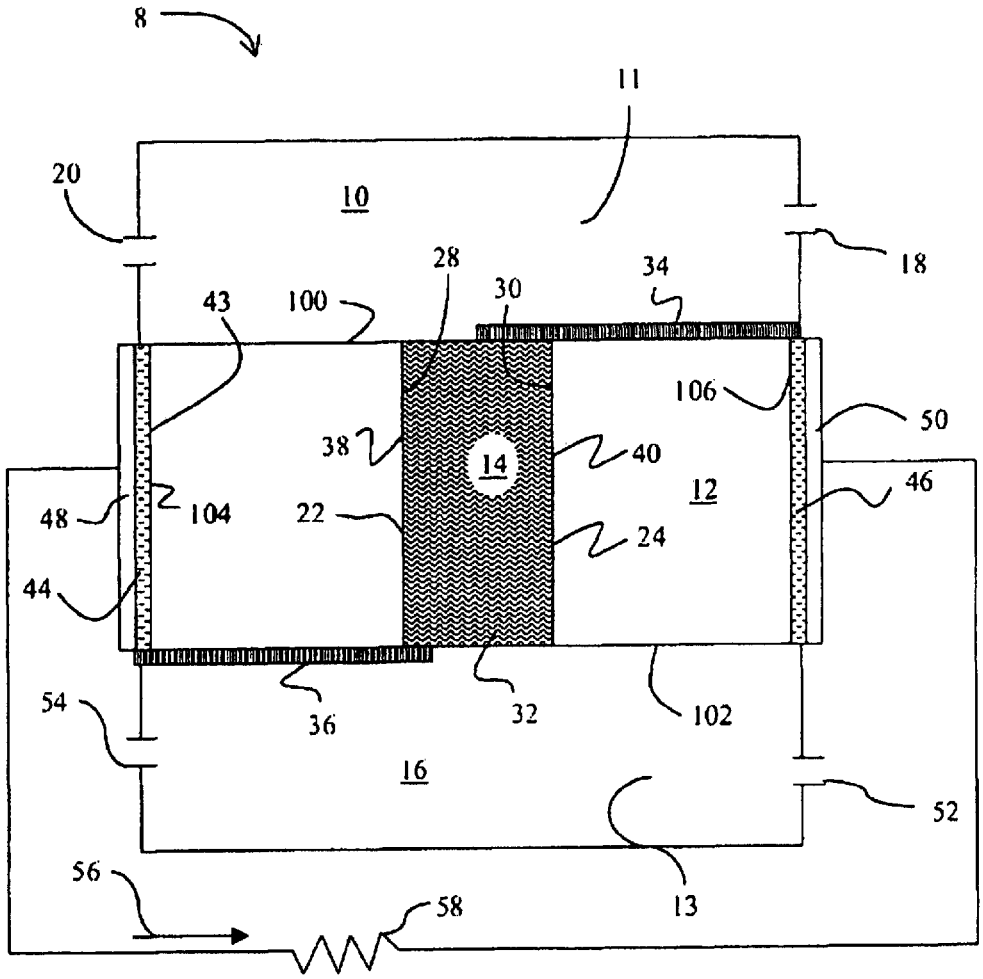
FIG. 1 is a cross-sectional view of a first embodiment of the inventive fuel cell.

The present invention relates to a microstructure fuel cell having a substrate, which is preferably porous, an assembly of fuel cells having a single or multiple substrate structure and methods for manufacturing such fuel cells and fuel cell layers.

The invention relates to a specific fuel cell architecture that is of an integrated design in which the functions of gas diffusion layers, catalyst layers, and electrolyte layers are integrated into a single substrate. This architecture makes it possible to fold together the various 'layers' of which a working fuel cell is formed and produce linear, curvilinear, undulating or even fractal shaped electrolyte paths that allow for higher volumetric power density to be achieved by increasing the electrochemically active surface area. In addition, by forming the various fuel cell layers within a single substrate the problem of simple contacting of fuel cell components to create electrical connections is eliminated, thus creating the potential for lower internal cell resistances to be achieved. The cell layers themselves can be constructed in planar, non-planar or involute configurations providing further advantages in increasing surfaces areas and providing flexibility in applications. This integrated design enables simpler manufacturing processes and scaling of the design.

Unlike existing fuel cell designs, the present invention, in one embodiment, provides convoluted electrolyte layers, which do not smoothly undulate. Other embodiments of the invention include shapes that are essentially non-smooth. Utilizing such non-smooth electrolyte paths allows for greater overall surface areas for the fuel cell reactions to be packed into a given volume that can be achieved when planar electrolyte layers are employed as in conventional fuel cell designs. The present invention also allows for significantly decreased distances between separate electrolyte layers, thereby allow for a greater surface area in a given volume than conventional designs.

The present invention contemplates the use of a design inspired by fractal patterns, which provides long electrolyte path lengths. The invention includes a method for building fuel cells and "stacks" that are not dependent on the layered process and which do not require the post-manufacturing assembly of distinct layered components. The conventional relationship between MEA layers and bipolar plates is eliminated, as is the reliance on multiple discrete layered structures. The invention also contemplates a design with individual fuel cells turned on their side relative to the overall footprint of the assembled fuel cell device. The invention contemplates building multiple fuel cells with an integrated structure on a single substrate using parallel manufacturing methods.

Specifically, it is contemplated to use a porous substrate for the fuel cell through which reactant gas will diffuse with little driving force. The substrate may or may not be electrically conductive. If it is conductive, it is contemplated to insulate at least a portion of the substrate, which typically would separate the anode from the cathode, this insulation may be formed by the electrolyte separating the anode from the cathode and, if necessary, an optional insulating structural member may be added. More specifically, the fuel cell is contemplated to have: (a) a fuel plenum comprising fuel; (b) an oxidant plenum comprising oxidant; (c) a porous substrate communicating with the fuel plenum, and the oxidant plenum further comprising a top, a bottom, a first side, and a second side; (d) a channel formed using the porous substrate, wherein the channel comprises a first channel wall and a second channel wall; (e) an anode formed from a first catalyst layer disposed on the porous substrate of the first channel wall; (f) a cathode formed from a second catalyst layer disposed on the porous substrate of the second channel wall; (g) electrolyte disposed in at least a portion of the channel contacting the anode and the cathode preventing transfer of fuel to the cathode and preventing transfer of oxidant to the anode; (h) a first coating disposed on at least a portion of the porous substrate to prevent fuel from entering at least a portion of the porous membrane; (i) a second coating disposed on at least a portion of the porous substrate to prevent oxidant from entering at least a portion of the porous substrate; (j) a first sealant barrier disposed on the first side and the second sealant barrier disposed on the second side; (k) a positive electrical connection disposed on the first side; (l) a negative electrical connection disposed on the second side; and wherein the resulting fuel cell generates current to drive an external load.

Referring to FIG. 1, which is a cross-sectional view of one embodiment of the invention, a fuel cell 8 has an optional fuel plenum 10 containing fuel 11. A porous substrate 12 is adjacent the optional fuel plenum 10. The fuel plenum can have an optional fuel plenum inlet 18. The fuel plenum can also have an optional fuel plenum outlet 20. An optional oxidant plenum 16 containing oxidant 13 is adjacent the porous substrate 12. The oxidant plenum can have an optional oxidant plenum inlet 52. The oxidant plenum can also have an optional oxidant plenum outlet 54. If no oxidant plenum is used the fuel cell uses the ambient environment as a source of oxidant.

The porous substrate 12 can have a shape that is rectangular, square or orthogonal or alternatively, it can be irregularly shaped. In this embodiment it is pictured as being formed within a single plane, although non-planar substrates or multiple substrate configurations are envisioned.

A channel 14, formed using the porous substrate, can be straight or of arbitrary design. If of arbitrary design the channel is referred to throughout this application is "undulating." If multiple channels are present at least one may be undulating. The channel 14 has a first channel wall 22 and a second channel wall 24. Additionally the porous substrate 12 has a top 100, bottom 102, first side 104 and a second side 106.

The channel can comprise an undulating channel, a straight channel or an irregular channel. If undulating, the channel can be sinusoidal in shape and if undulating, the channel may be of a shape that is in at least three planes.

An anode 28 is created on or alternately in the surface of the first channel wall 22, although the anode could be embedded in the wall as well. Anode 28 is created using a first catalyst layer 38 on or into the surface of the first channel wall 22.

A cathode 30 is formed on the surface or alternately in the second channel wall 24. Like the anode 28, the cathode 30 could be embedded in the second channel wall 24. Cathode 30 is created using a second catalyst layer 40.

Figure 1A:
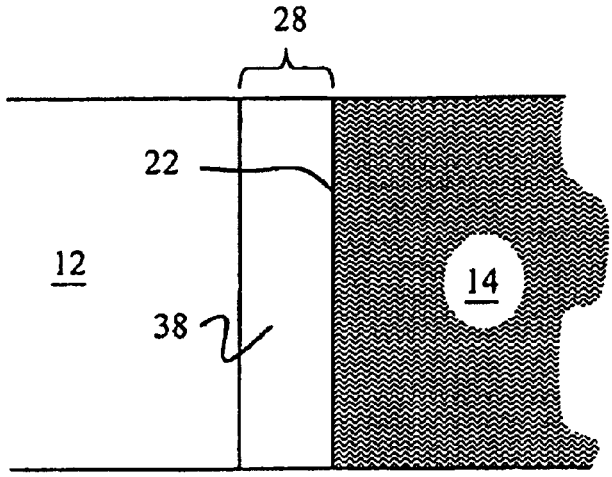
FIG. 1a is a cross-sectional detailed view of the anode with the catalyst at a first depth in the porous substrate.
Figure 1B:
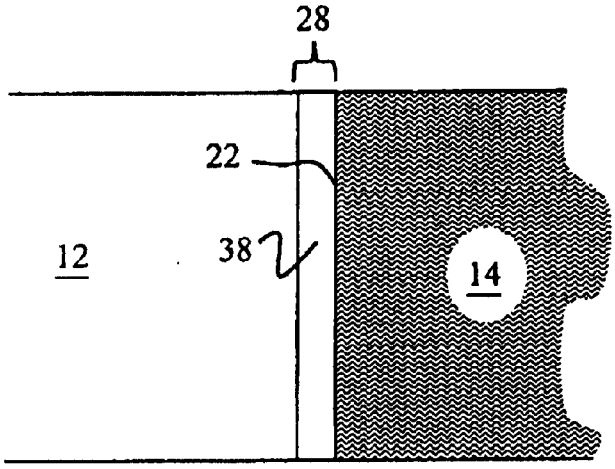
FIG. 1b is a cross sectional detailed view of the anode with the catalyst at a second depth in the porous substrate.
Figure 1C:
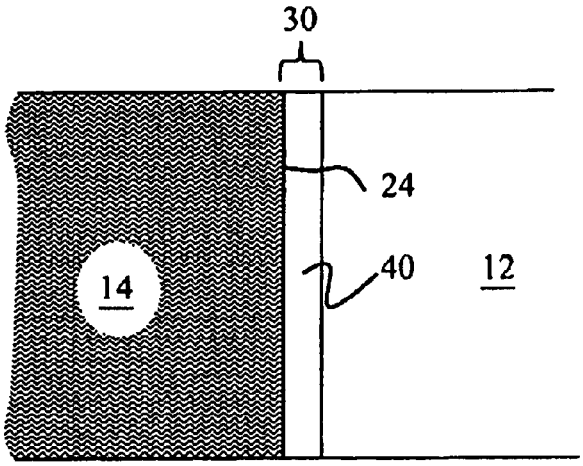
FIG. 1c is a cross sectional detailed view of the cathode.

FIGS. 1a, 1b and 1c provide details of the cathode and anode of the fuel cell. FIG. 1a shows the anode 28 at a first depth within the porous substrate 12, FIG. 1b shows the anode 28 at a second depth within the porous substrate 12 and FIG. 1c shows the cathode 30.

The catalyst layers can be deposited on the first and channel walls or can be formed in the channel walls. In one embodiment the first and second catalyst layers are disposed in the porous substrate to at least a minimum depth to cause catalytic activity.

Referring back to FIG. 1, an electrolyte 32 is disposed in the channel 14.

A first coating 34 is disposed on at least a portion of the porous substrate 12 preventing fuel from entering at least a portion of the porous substrate 12. A second coating 36 is disposed on at least a portion of the porous substrate 12 preventing oxidant from entering at least a portion of the porous substrate 12.

A first sealant barrier 44 is disposed on the first side of the porous substrate and a second sealant barrier 46 is disposed on the second side of the porous substrate. The sealant barriers can optionally be disposed within a sealant barrier channel 43.

A positive electrical connection 50 is engaged with the porous substrate 12 on the first side of the porous substrate.

A negative electrical connection 48 is engaged with the porous substrate 12 on the second side of the porous substrate.

The resulting fuel cell generates current 56 to drive an external load 58.

Figure 2:
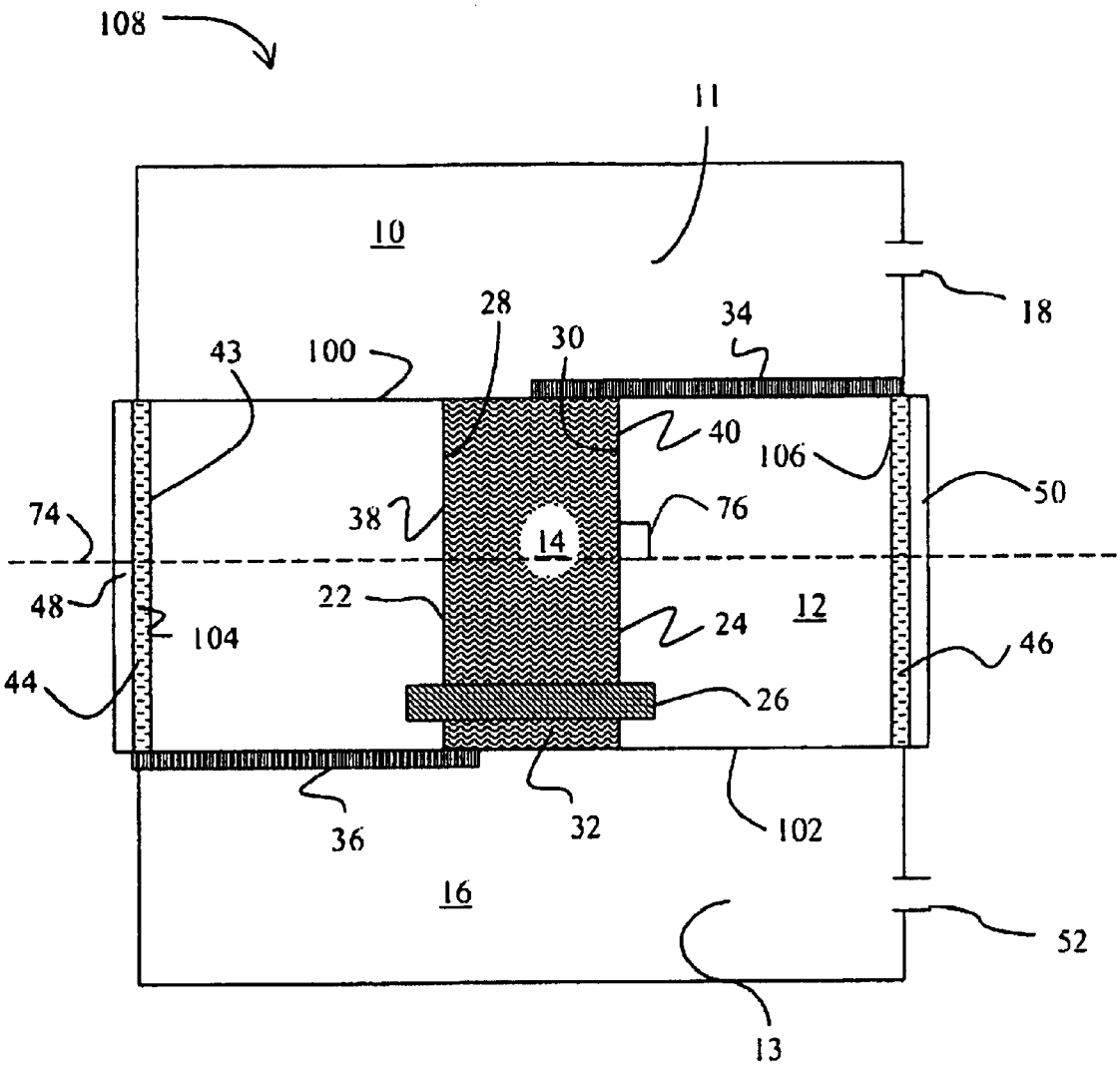
FIG. 2 is a cross-sectional view of a dead ended embodiment of the inventive fuel cell.

FIG. 2 is another embodiment of the invention showing a dead ended version of the fuel cell 108 specifically excluding the fuel outlet 20 and the oxidant outlet 54 of the FIG. 1 embodiment.

In one version of this embodiment of the invention, it is contemplated that the electrolyte 32 can be mounted in the channel 14 at an angle 76, preferably at an angle, which is perpendicular to the longitudinal or horizontal axis 74 of the predominant portion of the porous substrate 12.

Figure 2A:
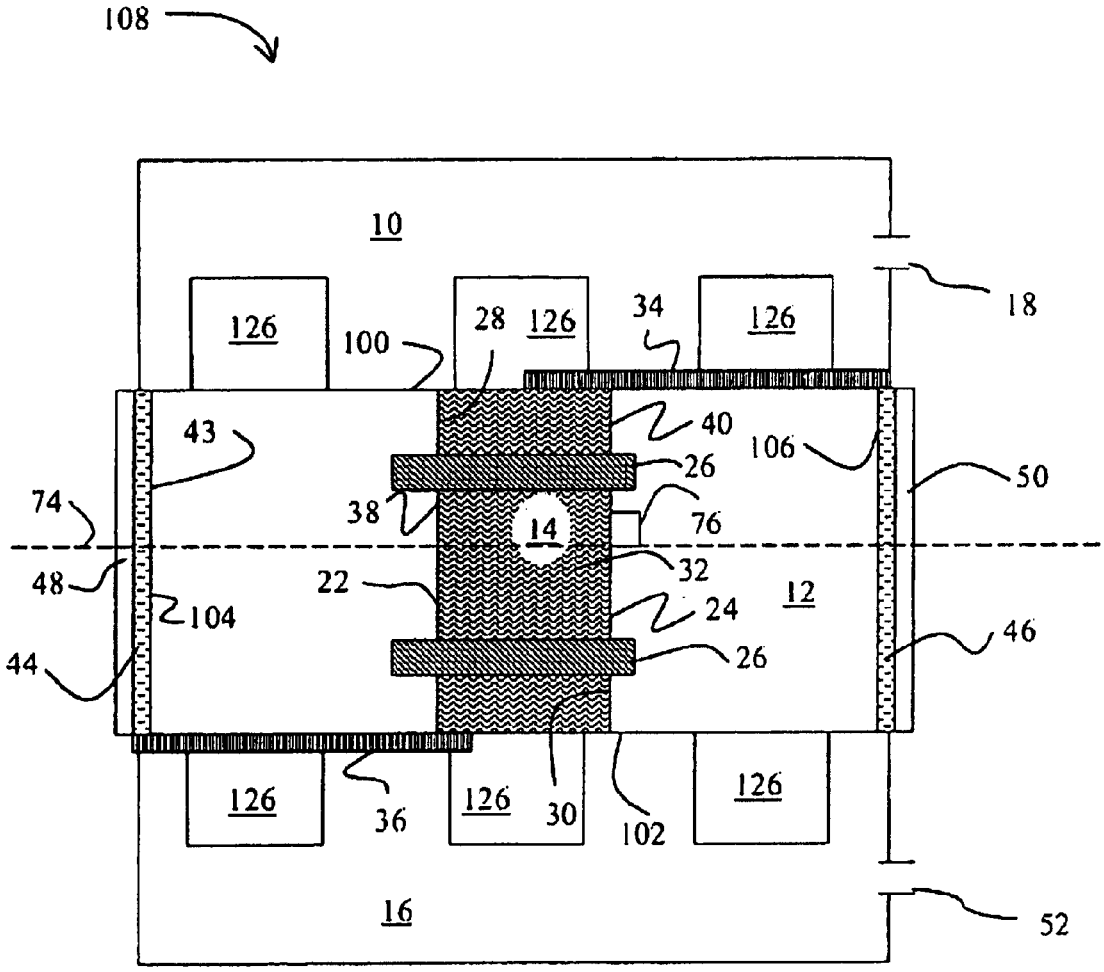
FIG. 2a is embodiment of the fuel cell according to the invention with the fuel and oxidant plenums being solid with flow channels contained therein.

In FIG. 2 an optional support member 26 separates first channel wall 22 from second channel wall 24 however the support member is not required in every embodiment. Some alternatives envision multiple support members as shown in FIG. 2a. Between one and 50, or more support members are contemplated herein.

Now referring to FIG. 2a, a fuel cell is shown with a solid fuel plenum 10 with flow fields 126 and a solid oxidant plenum 16 with flow fields 126. It is also envisioned that the fuel plenum comprises a permeable material containing the fuel. The oxidant plenum can also comprise a permeable material. It is understood that the fuel plenum and oxidant plenum need not be constructed in the same manner and a variety of combinations of oxidant and fuel plenum configurations can be used. The fuel plenum and the oxidant plenum can each have a variety of shapes, round, elliptoid, rectangular or square. It is particularly contemplated that the fuel plenum has a rectangular cross-section.

Figure 3:
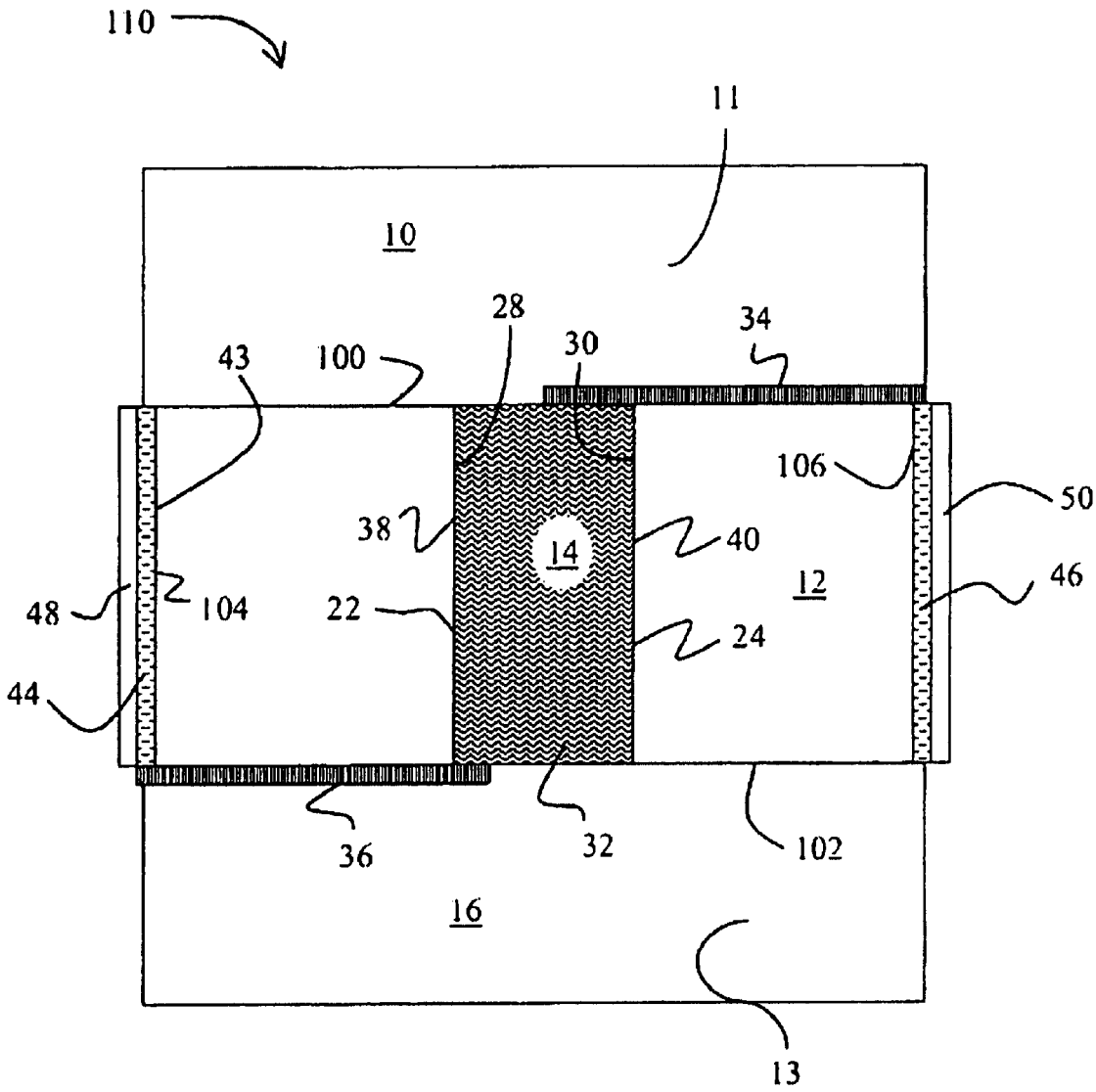
FIG. 3 is a cross-sectional view of another embodiment of a dead ended fuel cell.
Figure 3A:
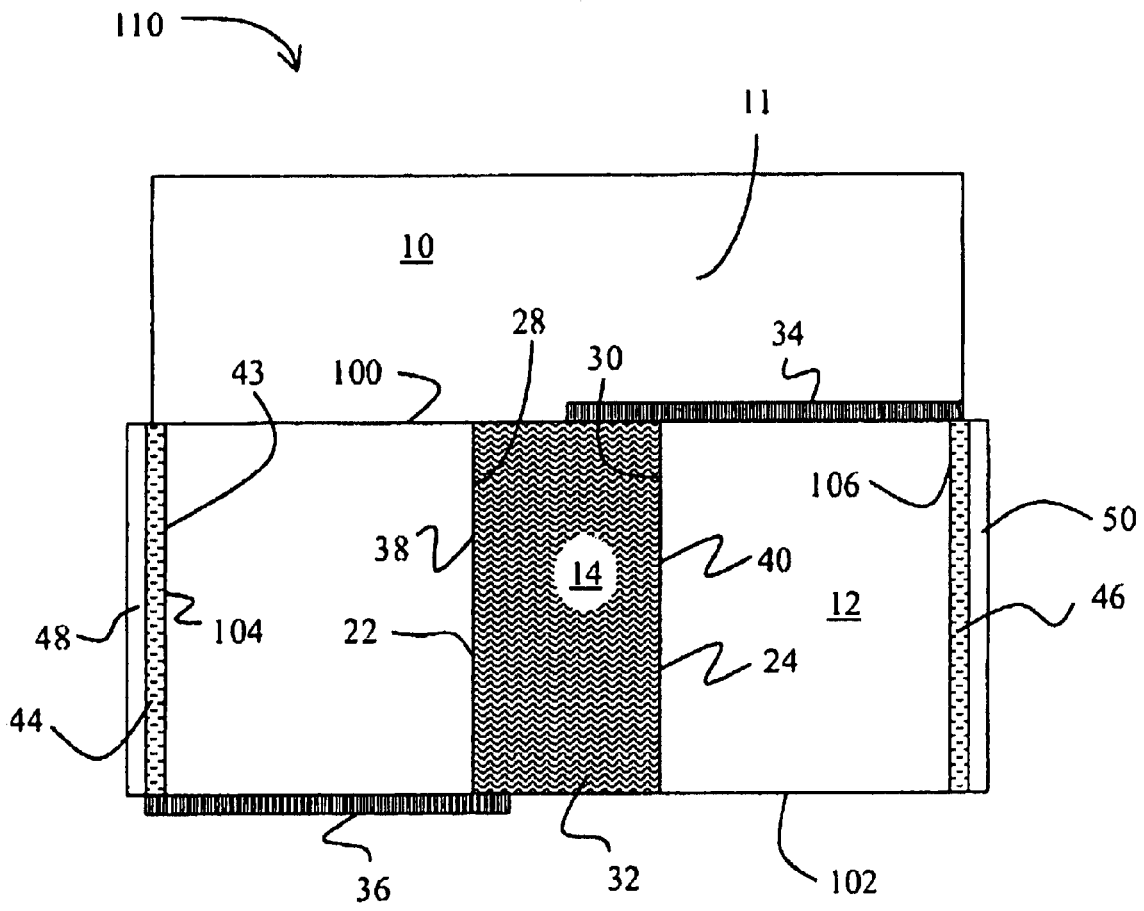
FIG. 3a is an embodiment of the invention with an oxidant plenum open to the ambient environment.
Figure 3B:
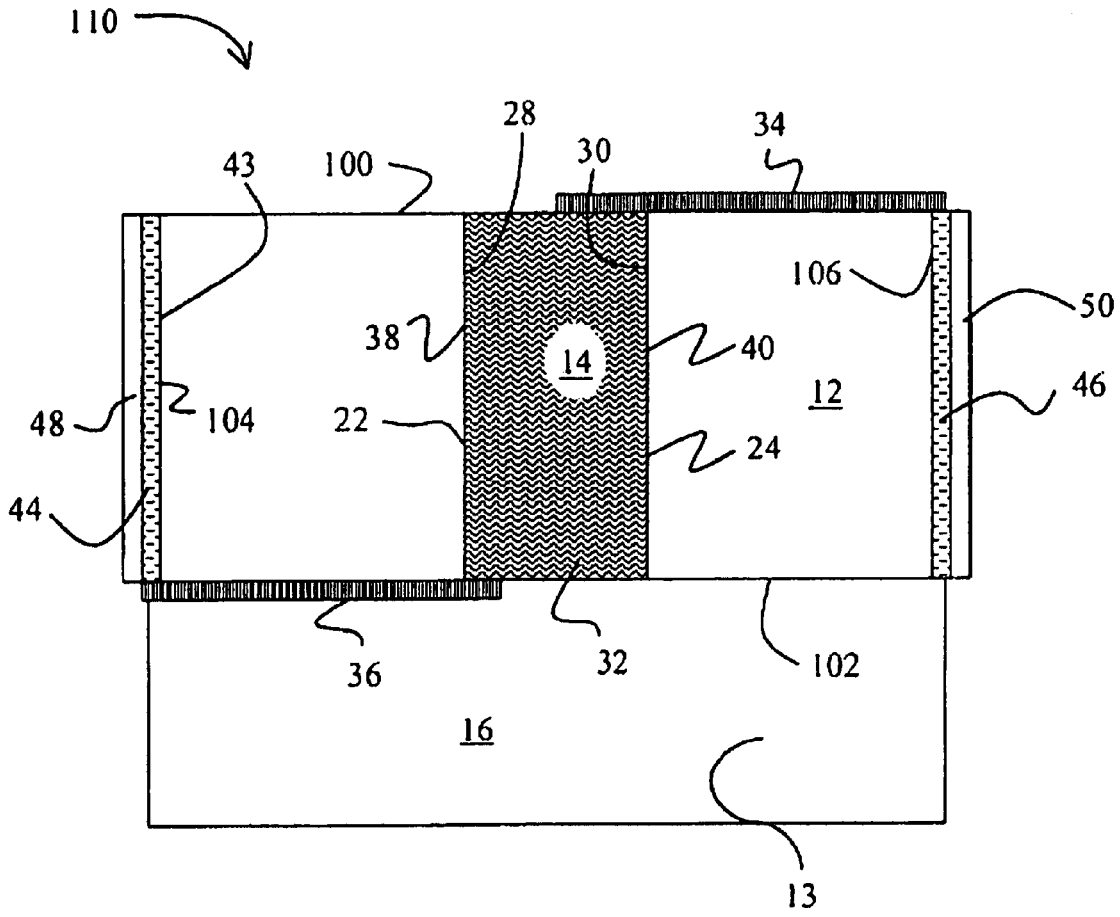
FIG. 3b is an embodiment of the invention with a fuel plenum open to the ambient environment.

FIG. 3 is a cross-section of another embodiment of a dead ended version of the fuel 110 that excludes the fuel inlet 18 and the fuel outlet 20 as well as the oxidant inlet 52 and the oxidant outlet 54 of the embodiment of FIG. 1. FIG. 3a shows an embodiment of the fuel cell where the oxidant plenum 16 is entirely removed. In such an embodiment the cell would use the ambient environment as an oxidant supply. FIG. 3b shows an embodiment of the fuel cell where the fuel plenum 10 is removed entirely. In this configuration the fuel cell uses the ambient environment as a fuel supply.

Figure 4:
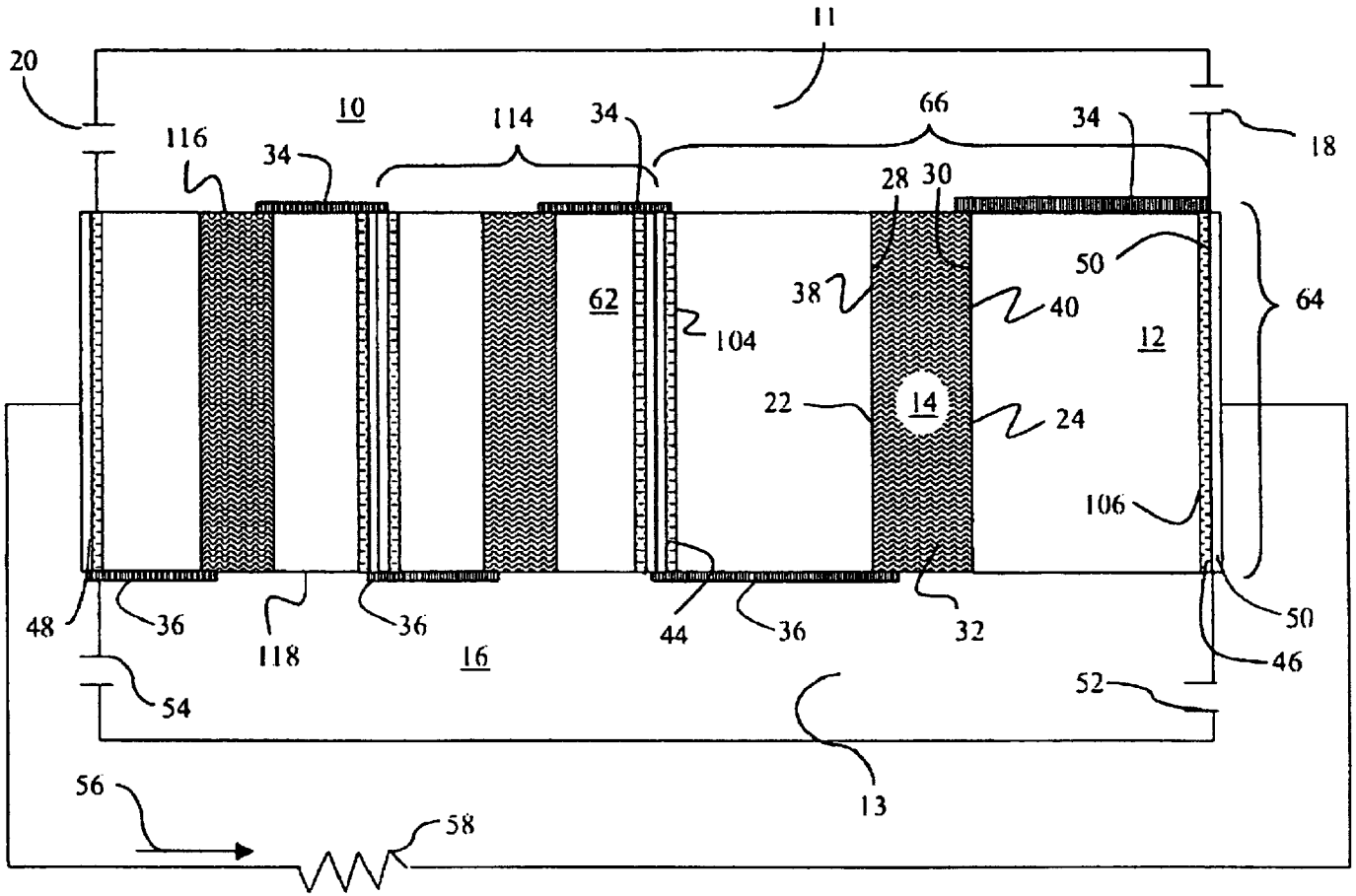
FIG. 4 is a cross-sectional view of a fuel cell layer formed by combining multiple fuel cells of the type described in FIG. 1.
Figure 5:
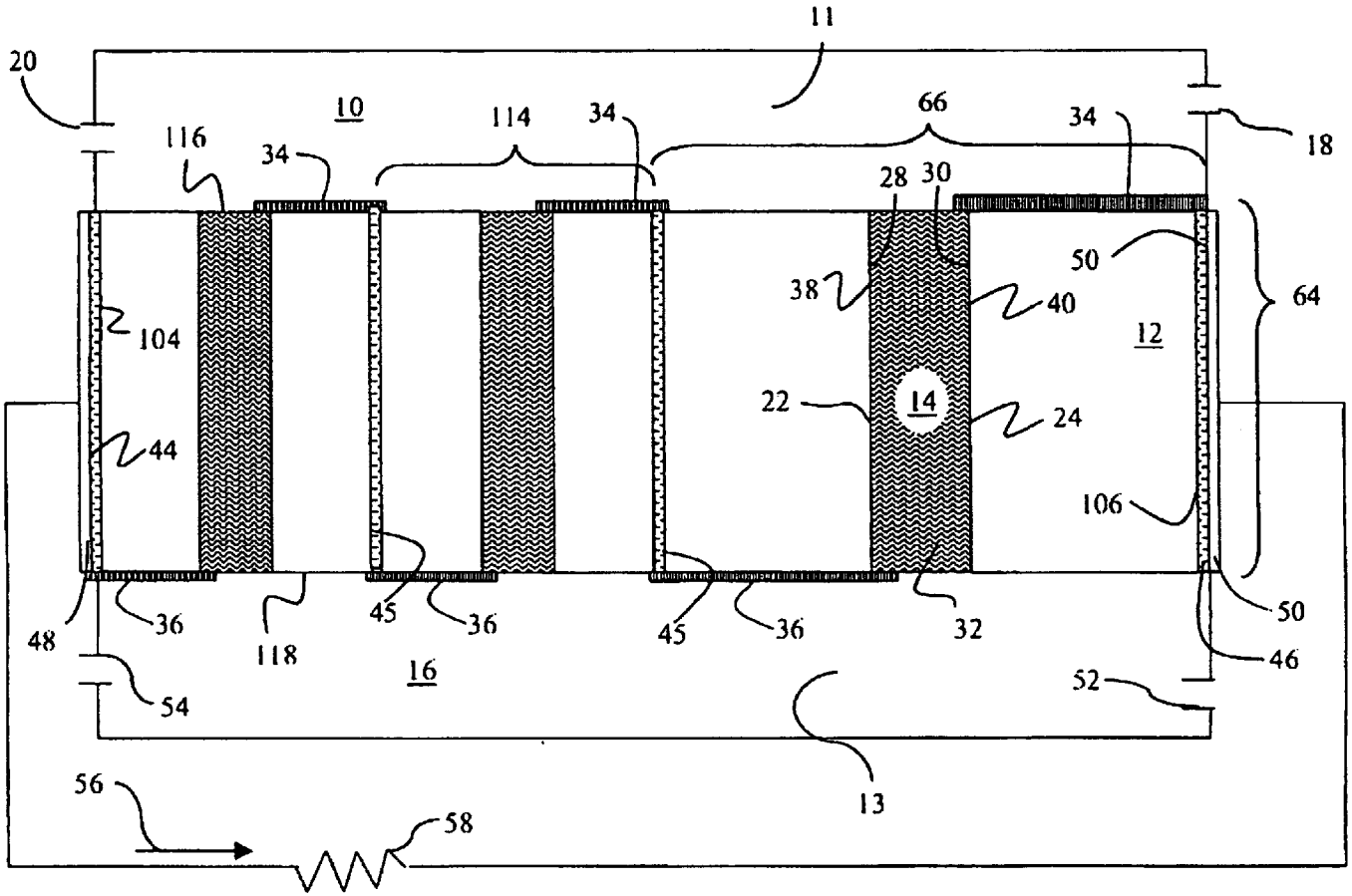
FIG. 5 is a cross-sectional view of a fuel cell with multiple fuel cells of the type described in FIG. 1 formed within a single substrate.

FIG. 4 shows a first fuel cell 66 formed from a substrate 12 that is made adjacent a second fuel cell 114 formed from a second substrate 62. The first and second fuel cells may be formed from either the association of multiple substrates or, as shown in FIG. 5, the first fuel cell 66 and the second fuel cell 114 may be formed by creating multiple channels 14 within a single substrate 12.

In FIG. 4, a plurality of fuel cell structures are formed using separate porous substrates and they are then connected to each other at the sealant barriers 44 forming a fuel cell layer. In this figure a first fuel cell 66 is connected to a second fuel cell 114. Multiple fuel cells can be connected together in this manner to create a fuel cell layer 64 with a fuel side 116 and an oxidant side 118. The details in the figure can be easily understood by referring to the items numbers in the description of FIG. 1 and will therefore not be elaborated here.

In this embodiment it is envisioned that the fuel cell be connected in series, in parallel or in combinations thereof to allow the fuel cell layer to produce current to drive an external load.

Figure 4A:
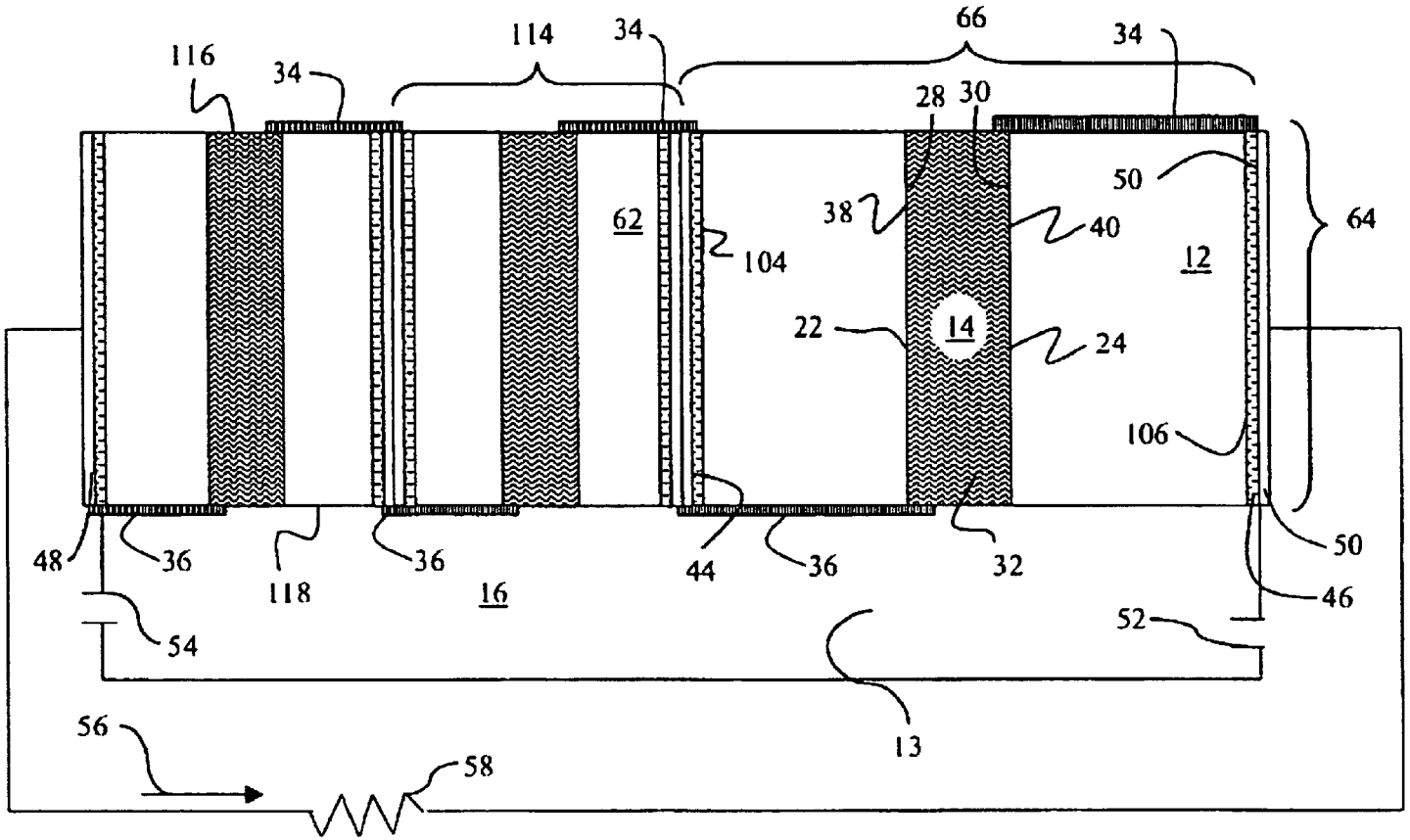
FIG. 4a is a cross sectional view of a multiple porous substrate fuel cell layer with the fuel plenum open to the ambient environment.
Figure 4B:
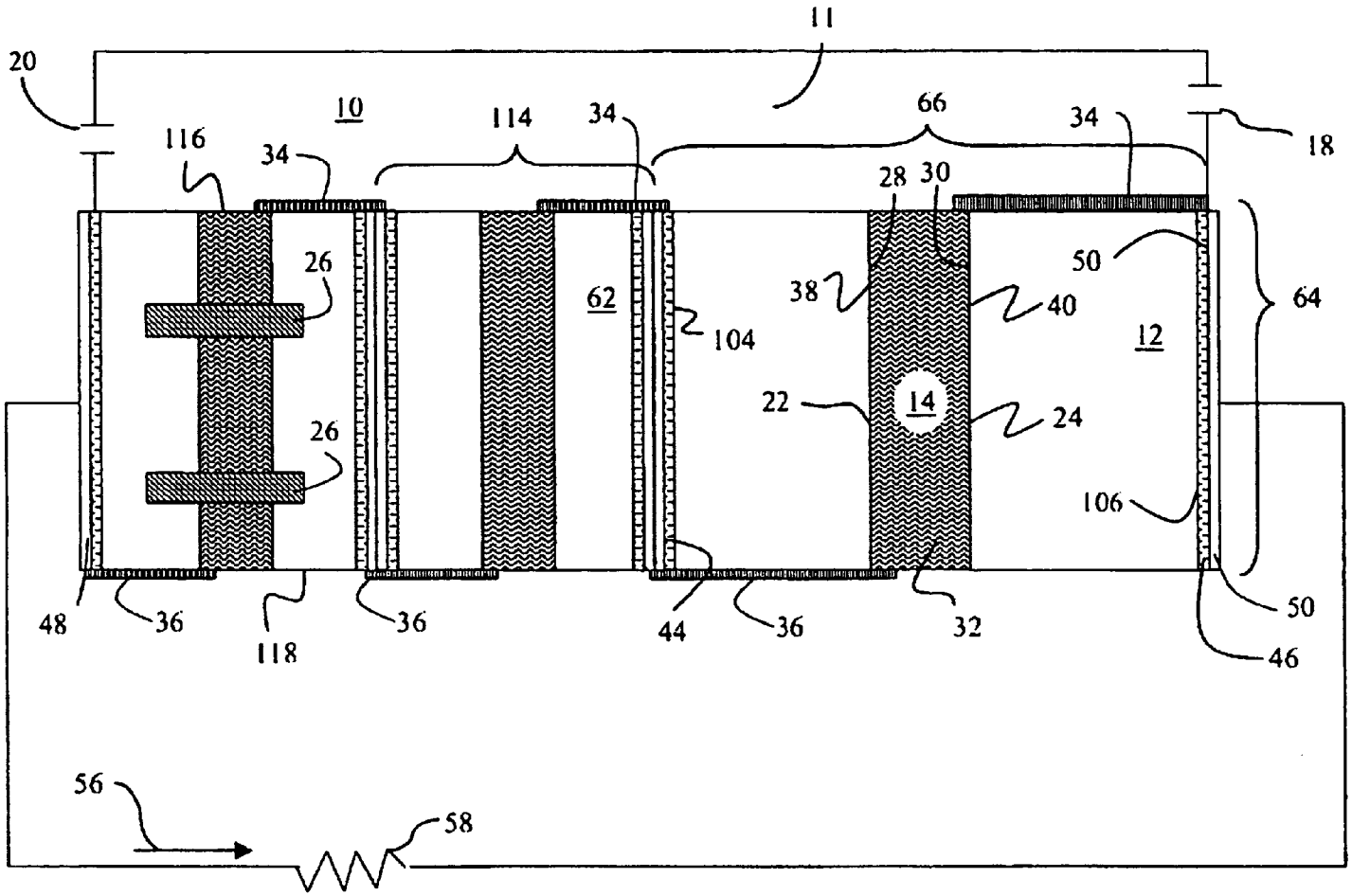
FIG. 4b is a cross sectional view of a multiple porous substrate fuel cell layer with the oxidant plenum open to the ambient environment.

FIG. 4a shows a fuel cell layer with the fuel plenum open to the ambient environment. FIG. 4b shows a fuel cell layer with the oxidant plenum open to the ambient environment. In this figure at least one optional support member 26 is shown on at least one of the fuel cells.

Figure 4C:
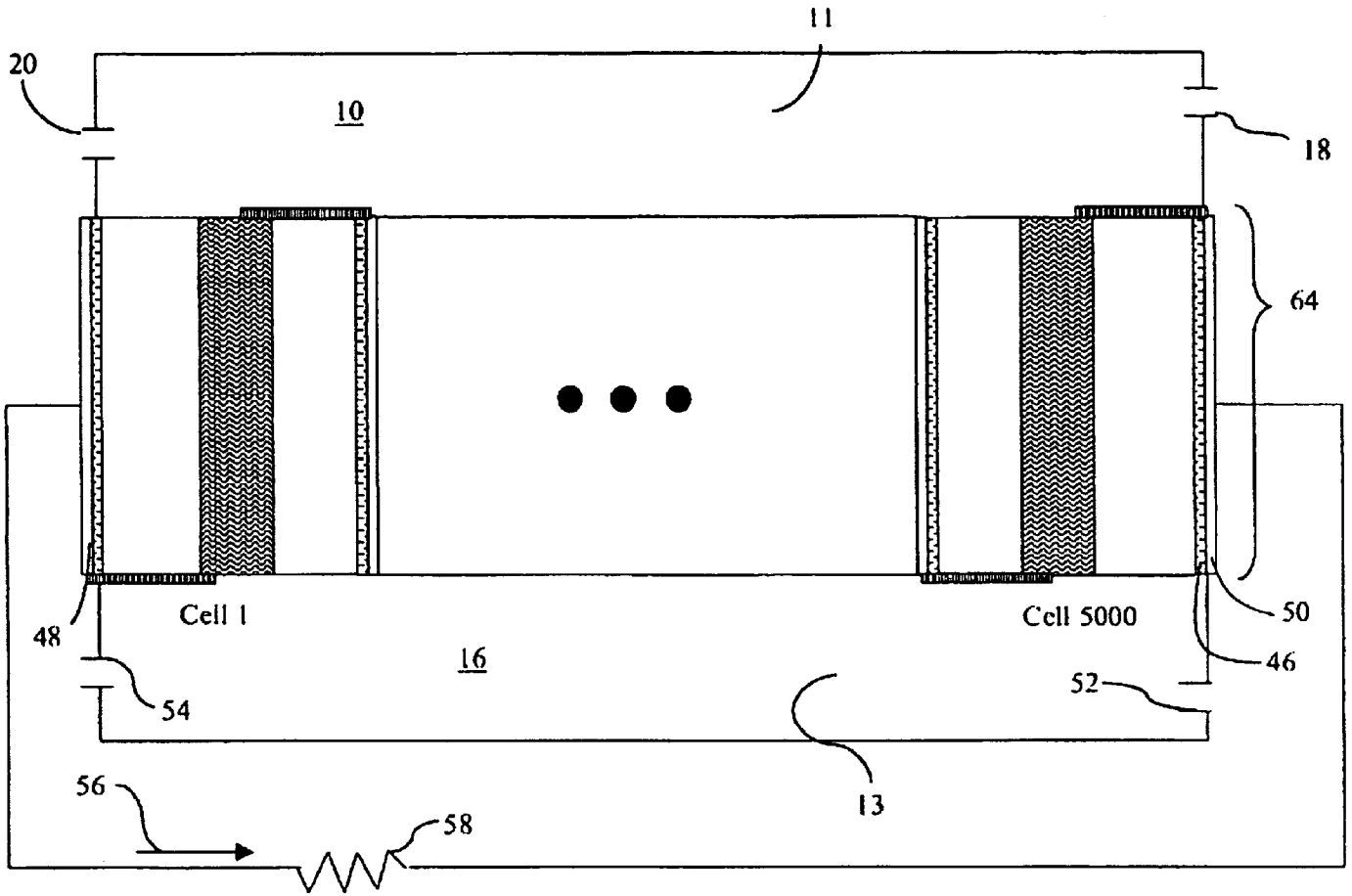
FIG. 4c is a cross sectional view of a fuel cell layer with up to 5000 fuel cells.

FIG. 4c shows an embodiment of the fuel cell layer wherein up to 5000 cells are connected together in the manner explained for FIG. 4.

In FIG. 5, the same fuel cell structures are formed in a single porous substrate 12. In this embodiment a plurality of fuel cells are created within the porous substrate in the same manner as described for FIG. 1. Since, in this case, the fuel cells are formed within a single substrate the sealant barriers and electrical connections associated with each fuel cell are not required. Instead a first sealant barrier 44 is disposed on the first side of the porous substrate, a second sealant barrier 46 is disposed on the second side of the porous substrate and a plurality of third sealant barriers 45 are disposed between the fuel cells. The sealant barriers provide gas impermeable separators between the fuel cells within the fuel cell layer.

It is understood that the same embodiments shown for the multiple substrate structure in FIGS. 4a, 4b and 4c can be used with the single substrate structure shown in FIG. 5.

This association of two fuel cells, either by the structure of FIG. 4 or the structure of FIG. 5, can be extended to place an arbitrary number of fuel cells in association with each other. In both embodiments, the ends of the multiple structures are sealed with a sealant barrier 44 and a second sealant barrier 46. In both embodiments, negative electrical connection 48 is attached on one end of the multiple fuel cell assembly and positive electrical connection 50 is attached on the other end of the multiple fuel cell assembly to allow the multiple fuel cell assembly to drive an external electrical load.

The association of multiple fuel cells produces a fuel cell layer 64 having a fuel side 116 that is brought into association with a fuel plenum 10 and an oxidant side 118 that is brought into association with an oxidant plenum 16.

If the substrate material from which the fuel cells within the fuel cell layer 64 is formed is conductive, then electrical current produced by the individual fuel cells is able to flow directly through the substrate material and the sealant barriers 44 to create a bipolar fuel cell structure within the formed fuel cell layer. If the substrate material from which the fuel cells within the fuel cell layer are formed is not electrically conductive than the first coating 34 and second coating 36 should both be made of an electrically conducting material and formed so that the first coating 34 is in electrical contact with the second catalyst layer 40 while second coating 36 is in electrical contact with the first catalyst layer 38. The first coating 34 and the second coating 36 are also made in electrical contact with the conductive sealant barrier 44. In either case, with a conductive or non-conductive substrate the electrical current produced by the fuel cell can be transported to the positive and negative electrical connections.

Figure 5A:
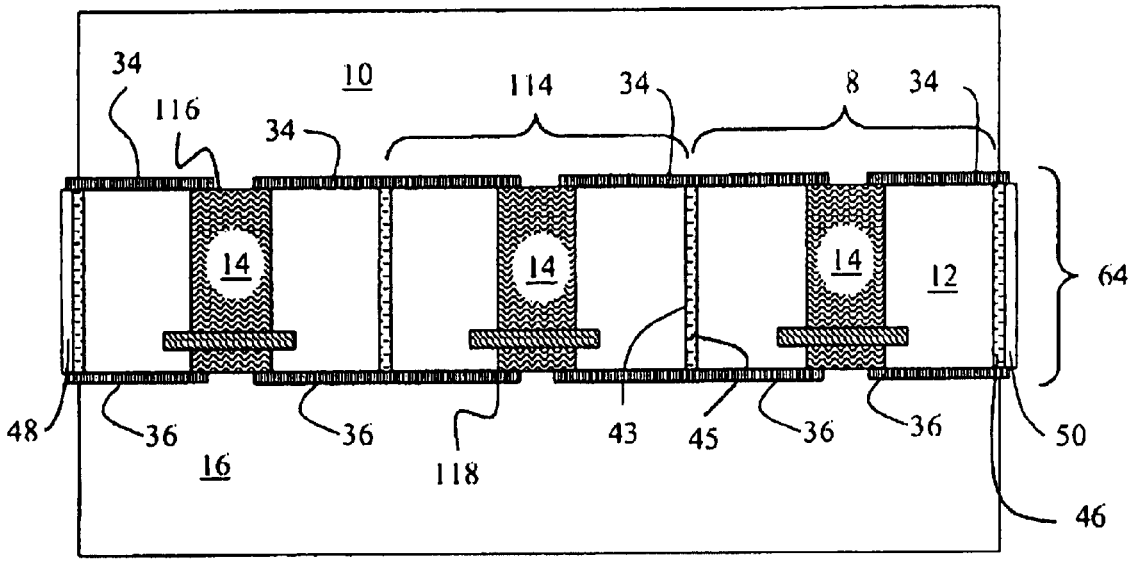
FIG. 5a is another embodiment of a fuel cell with multiple cells.

An alternate configuration for the fuel cell layer is shown in FIG. 5a. In this configuration the first coating 34 is extended to connect the anode of the first fuel cell to the cathode of the second fuel cell. The second coating 36 is likewise extended to contact the anode of the first fuel cell. The first coating on the end of the second coating on the end can be used to connect the fuel cells on the ends to the positive electrical connection 50 and the negative electrical connection 48. In this configuration portions of the first coating are porous to allow fuel to reach the anode and portions of the second coating are porous to allow oxidant to reach the cathode. In this configuration neither the porous substrate nor the sealant barrier need be electrically conductive. It is also envisioned that only the first coating be extended to provide electrical contact between the cells or that only the second coating be extended to provide electrical contact between the cells.

When multiple fuel cells are formed into a fuel cell layer, as described in FIGS. 4 and 5 a series electrical connection of the individual fuel cells results. The summed voltages of the multiple fuel cells produce a potential difference between the positive and negative electrical connections at either end of the fuel cell layer. A larger number of fuel cells will enable the fuel cell layer to produce a higher voltage between the electrical connections. Any combination of conductive or non-conductive substrates, barriers and caps may be used so long as an electrically conductive path between neighbouring anodes and cathodes is created. In this manner either an edge collected or preferably a bipolar series electrical connection of each of the fuel cells in the fuel cell layer is achieved without the need to clamp distinct components together and without the use of independently formed layered components. Also, the direction of current flow in the fuel cell layer is overall in the plane of the fuel cell layer rather than being orthogonal to the fuel cell layer as is the case in most current designs. It is also envisioned to electrically connect the fuel cells within a fuel cell layer together in parallel or in a combination of series and parallel.

Figure 6:
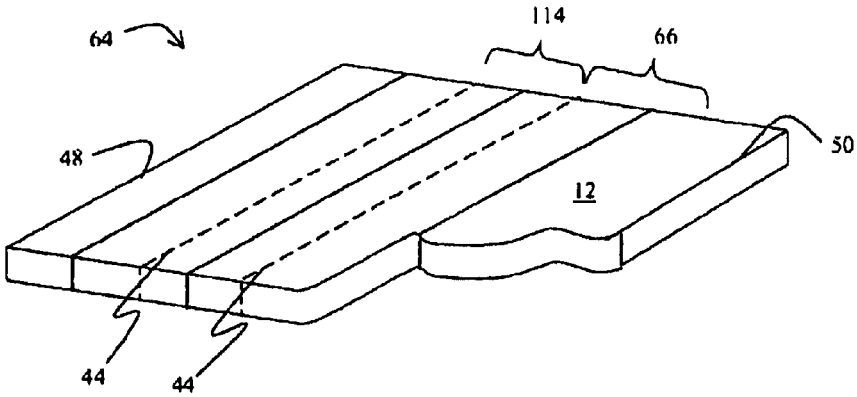
FIG. 6 is a perspective view of a fuel cell layer containing multiple fuel cells of the type described in FIG. 1.

FIG. 6 is a cutaway perspective view of a fuel cell layer 64. In this figure a first fuel cell 66 is separated from a second fuel cell 114 by a sealant barrier 44. A third fuel cell 115 is separated from the second fuel cell 114 by another sealant barrier 44. The layer has the same structure as the layers described in FIGS. 4 and 5. The single fuel cell layer 64 can contain as many sealant barriers and cells as desired. The determination of the spacing between individual fuel cells within the fell cell layer is at the discretion of the designer, limited by pragmatic issues of manufacturability and mass transport issues within the porous substrate.

The overall structure of the fuel cell layer 64 creates a series connection of the individual fuel cells. Positive electrical connection 50 and negative electrical connection 48 allow an external load to be connected to the fuel cell layer, which produces a voltage that is a multiple of the single cell voltages produced within the fuel cell layer.

Figure 7:
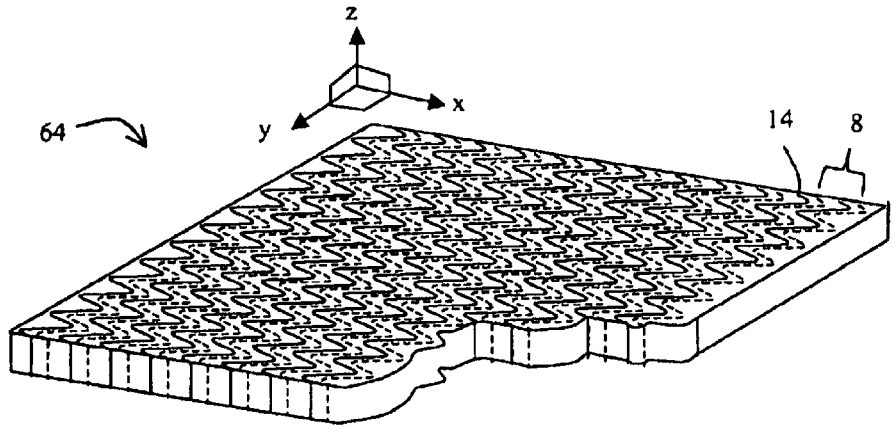
FIG. 7 is another detailed perspective view of the fuel cell of the invention with undulating channels.

FIG. 7 shows a similar view as FIG. 6 of the fuel cell layer 64 but in this Figure, each of the fuel cells 8 have a channel 14 with a less straight structure. Again, as with FIG. 6, FIG. 7 uses essentially the same structure as shown in FIGS. 4 and 5, but repeated multiple times creating a multi-cell structure. The less straight structure of the channels allows for increased electrochemically active areas for the anodes and cathodes formed on the channel walls. The less straight channels can be smoothly undulating or can be irregular in shape resembling a fractral structured path which is known to have extremely high area. Any arbitrary channel structure can be used with this invention allowing for the optimization of the area of the electrodes in each fuel cell. A preferred embodiment includes a plurality of thin channels that run parallel to each other and follow an irregular path that folds back on itself in a manner suggestive of a fractal pattern. Another preferred embodiment of the invention includes at least one channel that is in at least three planes.

Figure 8:
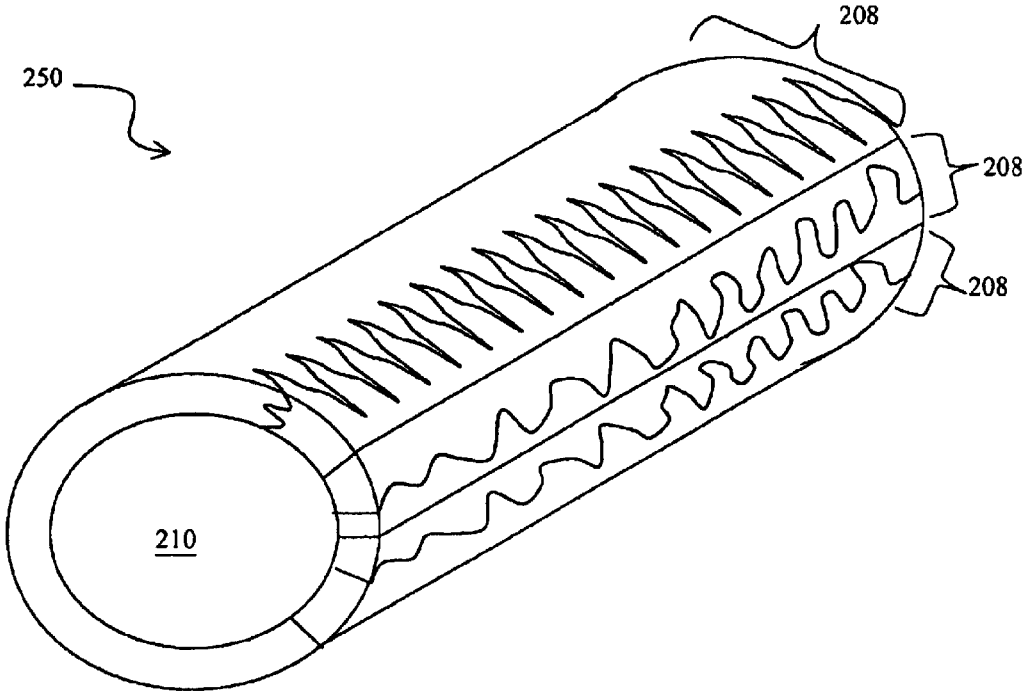
FIG. 8 is a perspective view of a cylindrical version of a fuel cell according to the invention.

FIG. 8 shows a perspective view of a cylindrical version 250 of a multiple fuel cell layer. In this version a multitude of non-planar fuel cells 208 are combined to create a fuel cell layer that encloses a volume 210. The enclosed volume 210 is used as the fuel plenum while oxidant is supplied by the environment outside the cell. It is also envisioned that the fuel be supplied by the environment outside the cylinder and that the enclosed volume 210 be used as an oxidant plenum. The cylindrical fuel cell 250 can either be constructed using a single porous substrate which is in the shape of a cylinder using the method discussed for combining cells in FIG. 5 or with multiple porous substrates that are brought together into a cylinder using the method discussed for combining cells in FIG. 4.

Figure 8A:
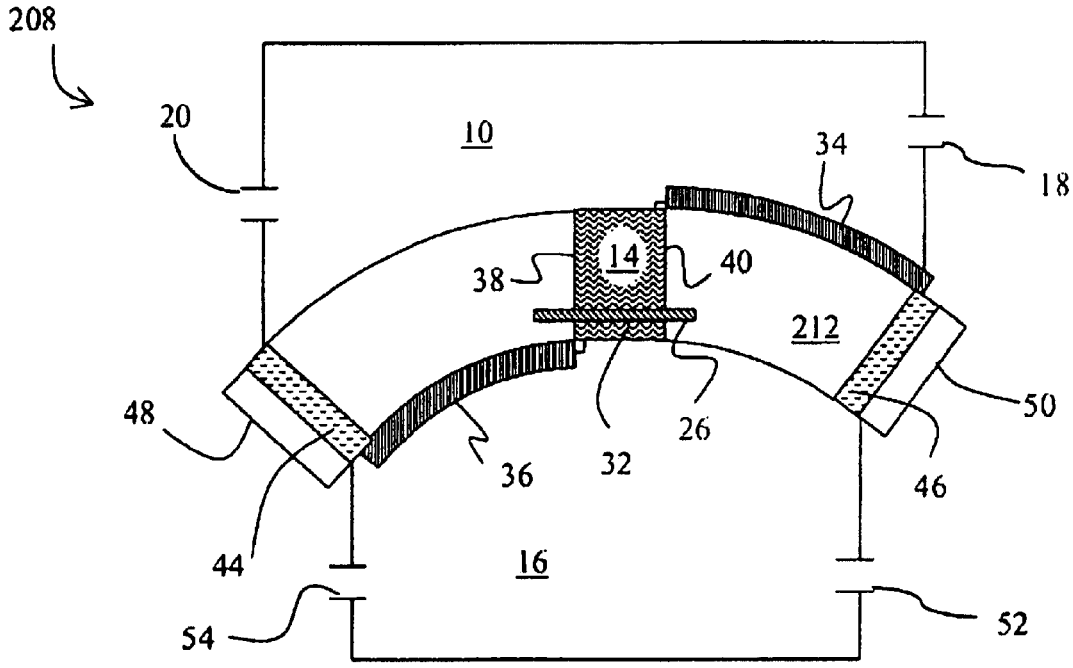
FIG. 8a is a cross-sectional view of an embodiment of the fuel cell of FIG. 1 in which the substrate is irregularly shaped.

FIG. 8a is a cross-section of a non-planar version of the fuel cell 208. The fuel cell has a fuel plenum 10 with fuel inlet 18 and fuel outlet 20 and an oxidant plenum 16 with oxidant inlet 52 and oxidant outlet 54. A non-planar porous substrate 212 is in communication with both the fuel plenum 10 and the oxidant plenum 16. A channel 14 is formed within the non-planar porous substrate 212. The channel 14 has an anode 40 and a cathode 38 constructed as described for FIG. 1 and is filled with electrolyte 32. The fuel cell has a support member 26 a first coating 34 and a second coating 36. The negative electrical connector 48 is shown adjacent sealant barrier 44. The positive electrical connector 50 is shown adjacent the optional sealant barrier 46. Although in this figure an arc is used to show the non-planar nature of the fuel cell, any arbitrary configuration could be used. As with the fuel cells of FIG. 1 the non-planar fuel cell can be combined to form a non-planar fuel cell layer with multiple cells and can be associated with fuel and optional oxidant plenums of various configurations.

Figure 9:
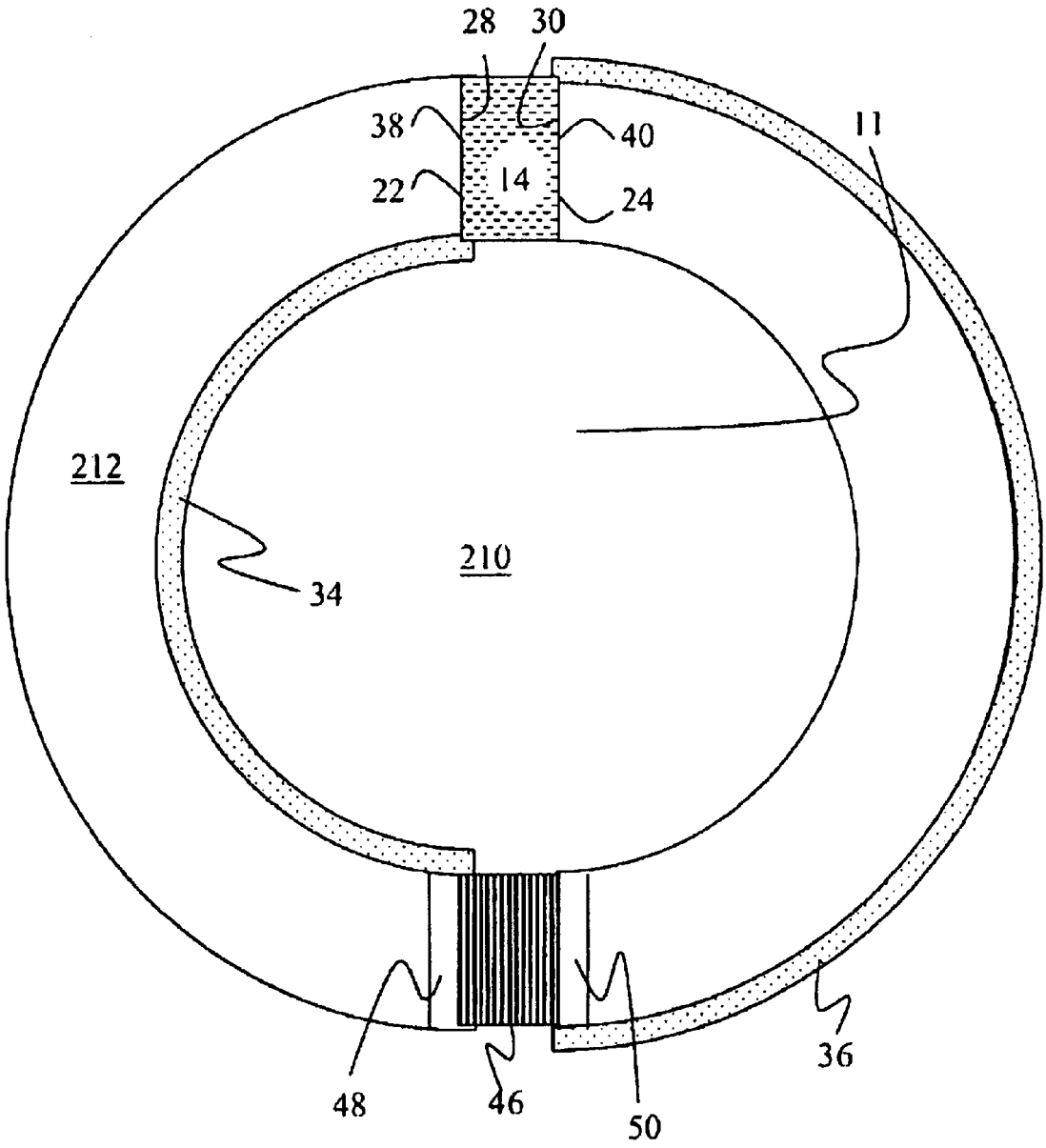
FIG. 9 is a cross sectional view of a cylindrical version of a fuel cell according to the invention.

FIG. 9 shows a cross sectional view of a cylindrical version of a fuel cell. In this case the non-planar substrate 212 is shaped in the form of a cylinder to enclose a volume 210. The fuel cell in this figure is shown with fuel 11 in the enclosed volume 210 providing fuel to the fuel cell. In this configuration the ambient environment outside the cell supplies oxidant. It is also envisioned that oxidant be contained within the enclosed volume 210 and that the ambient environment supply the fuel.

Figure 10:
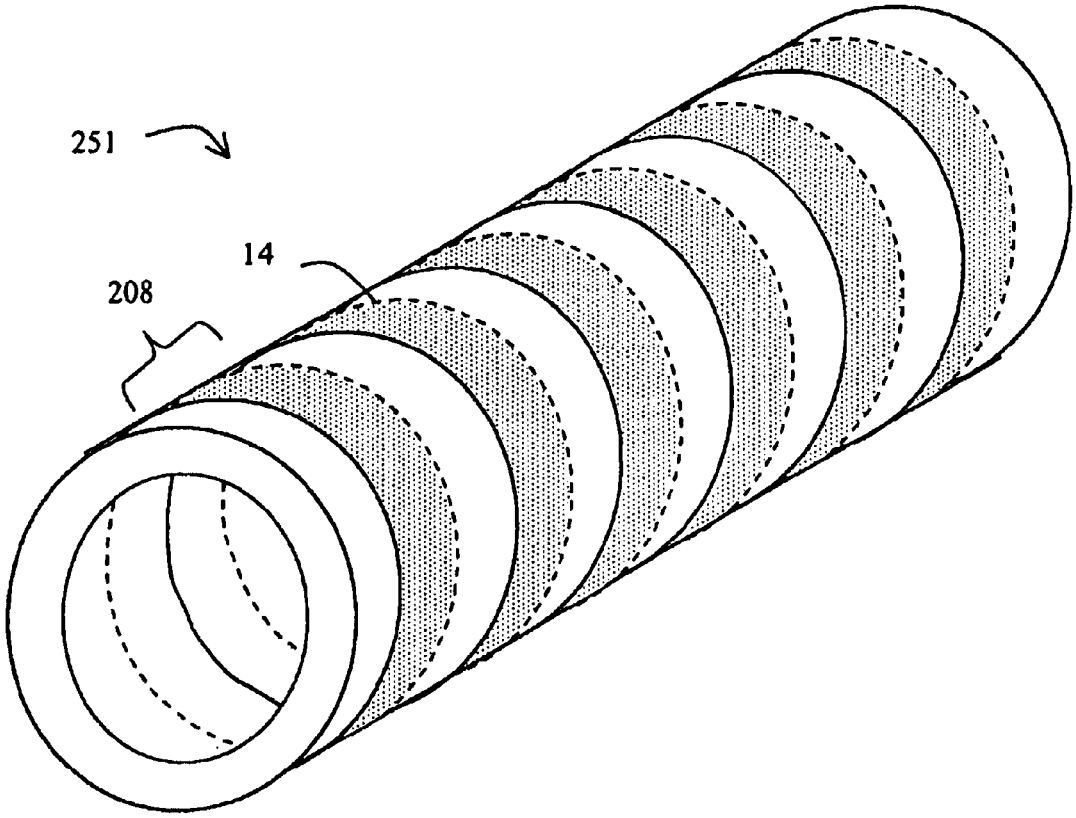
FIG. 10 is another embodiment of the inventive fuel cell of the invention with the channels in the form of a set of stacked annular rings.

FIG. 10 is another embodiment of a cylinder fuel cell 251 having the channels 14 of the non-planar fuel cells 208 configured radially and orthogonal to the axis of the cylinder. It is understood that the fuel cells 208 within this figure can either be constructed or assembled, as described for FIG. 4 or that they be formed within a single cylindrical substrate as described for FIG. 5.

Figure 11:
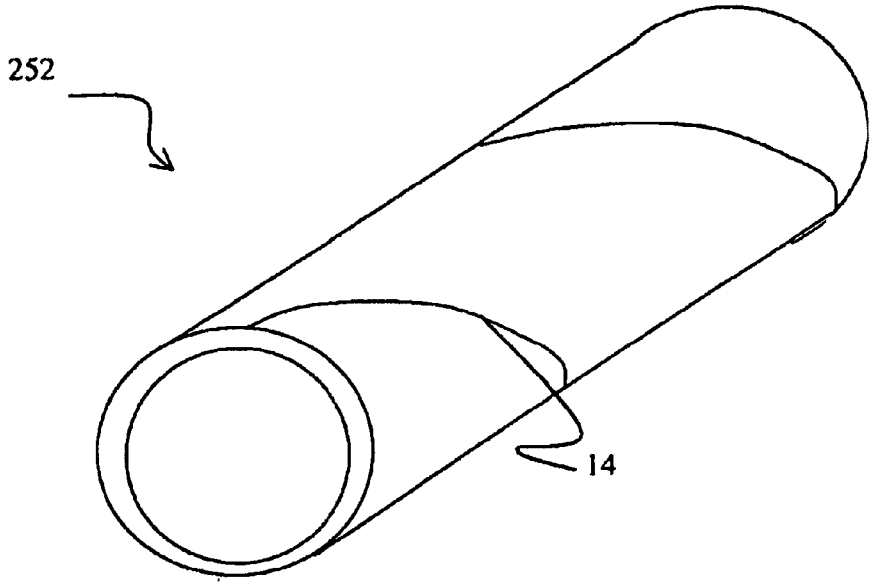
FIG. 11 is another embodiment of the inventive fuel cell with the channels in the form of a spiral around the cylinder.

FIG. 11 is another embodiment of a cylindrical fuel cell 252 having the channel 14 of the non-planar fuel cell disposed in a wound or spiral fashion around the perimeter of the cylinder. Although, in this figure, only a single spiral channel 14 is shown, multiple fuel cells with multiple channels could be formed using the porous substrate.

Although only cylindrical cells have been shown enclosing a volume it is contemplated herein that shapes such as extruded rectangles, squares, ovals, triangles and other shapes as well as non-extruded shapes such as cones, pyramids, football shaped objects and other shapes that enclose a volume are included as part of the invention.

Figure 12:
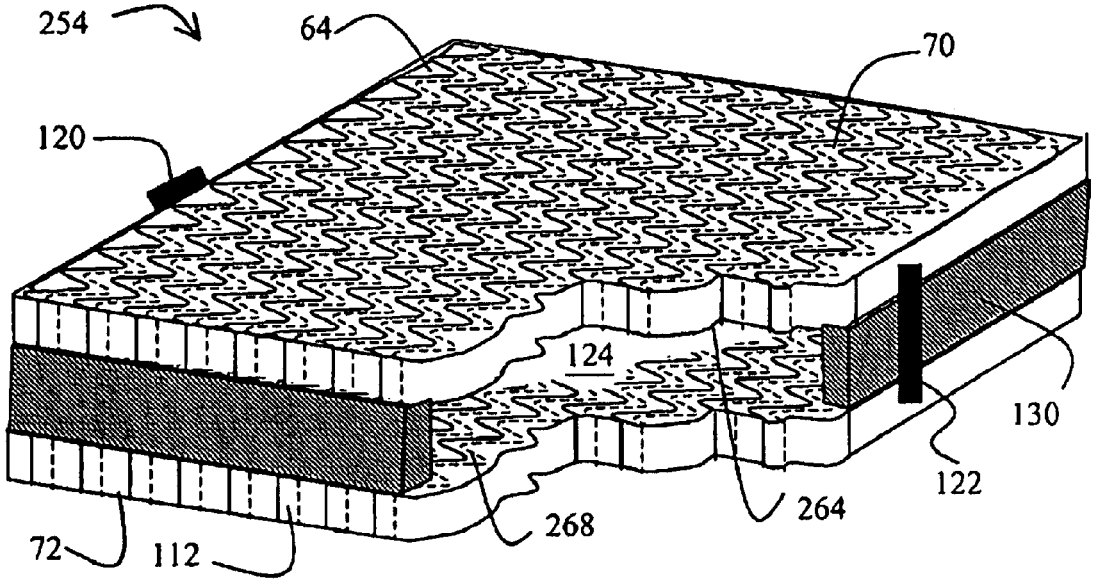
FIG. 12 is a perspective view of a bi-level fuel layer structure.

FIG. 12 is a cutaway perspective view of a bi-level fuel cell layer structure 254 with two fuel cell layers, a first fuel cell layer 64 and a second fuel cell layer 112 each comprising an anode side and a cathode side wherein the first fuel cell layer 64 is stacked on top of the second fuel cell layer 112 such that the anode side 264 of the first fuel cell layer and the anode side 268 of the second fuel cell layer adjoin.

In this Figure, a seal 130 is disposed between the first and second fuel cell layer to form a fuel plenum 124. The two positive electrical connections are connected to positive connector 120 and the two negative electrical connections are connected to negative connector 122 so that the individual fuel cell layers are now connected in an electrically parallel configuration. The resulting assembly is a bi-level fuel cell layer structure 254 having a top 70 and a bottom 72, the top and bottom being the cathode sides of the respective fuel cell layers. The resulting structure is an enclosed plenum air breathing fuel cell that achieves a series electrical connection of the individual fuel cells in each fuel cell layer and a parallel electrical connection of the two fuel cell layers. Only fuel is required to be fed to the interior of the structure and electrical current flows within the two fuel cell layers independently of one another. There is no electrical connection between the two fuel cell layers except at the parallel connection of the positive and negative electrical connections at either end of the fuel cell layers in the structure.

Figure 12A:
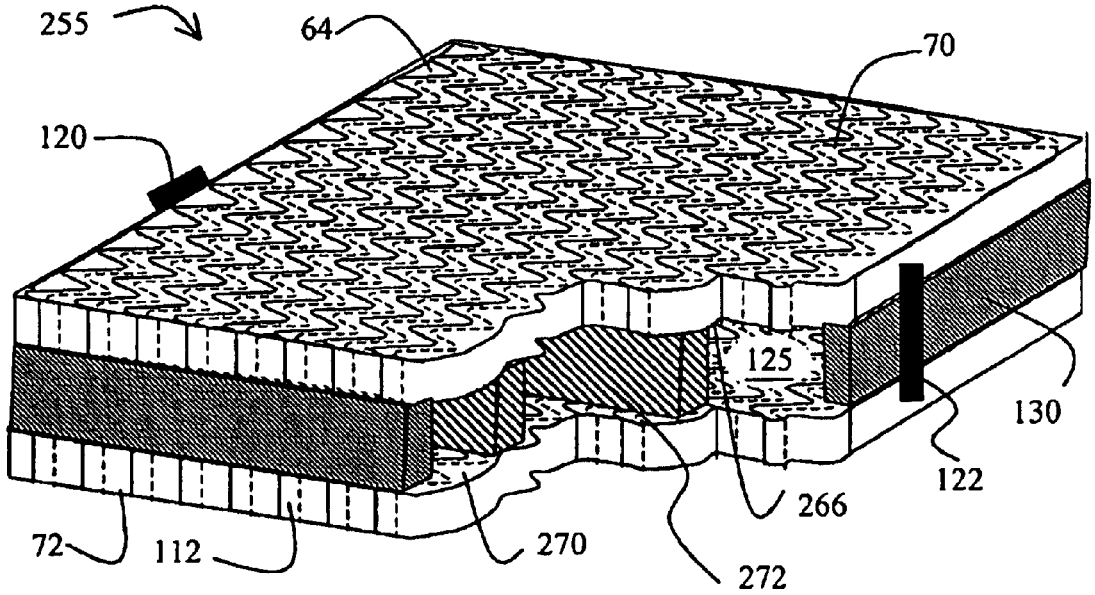
FIG. 12a is a perspective view of another bi-level fuel cell layer structure.

An optional solid material with a flow field (not shown in this figure) can be disposed in the plenum 124 created by the first and second fuel cell layers 64, 112 and the seal 130. The plenum could also comprise a permeable material or a hydrogen storage material. Alternately pressurized hydrogen or a liquid fuel could be stored within the plenum. It is also envisioned that the plenum be open to the ambient environment. The connectors can also be disposed in such a manner as to connect the layers in series rather than in parallel. p FIG. 12a shows another embodiment of a bi-level fuel cell layer structure 255 but in this embodiment the fuel cell layers 64, 112 are place such that their cathode sides 266, 270 adjoin. In this embodiment oxidant is supplied to the oxidant plenum 125 formed by the seal 130 and fuel is supplied to the structure top 70 and bottom 72.

In FIG. 12a an optional solid material with a flow field 272 is shown within the plenum 125 created by the first and second fuel cell layers 64, 112 and the seal 130. The plenum could also comprise a permeable material. It is also envisioned that the plenum be open to the ambient environment. The connectors can also be disposed in such a manner as to connect the layers in series rather than in parallel.

Both configurations of the bi-level fuel cell layer structure form a stand-alone electrical power-generating device with a parallel connection of the two fuel cell layers doubling the power output of the structure compared to the individual layers.

When reactant is delivered to the fuel cell structure from some external source and is flowed through the fuel cell layers it is desirable to control the flow of the fuel over the fuel cell layer.

Figure 13:
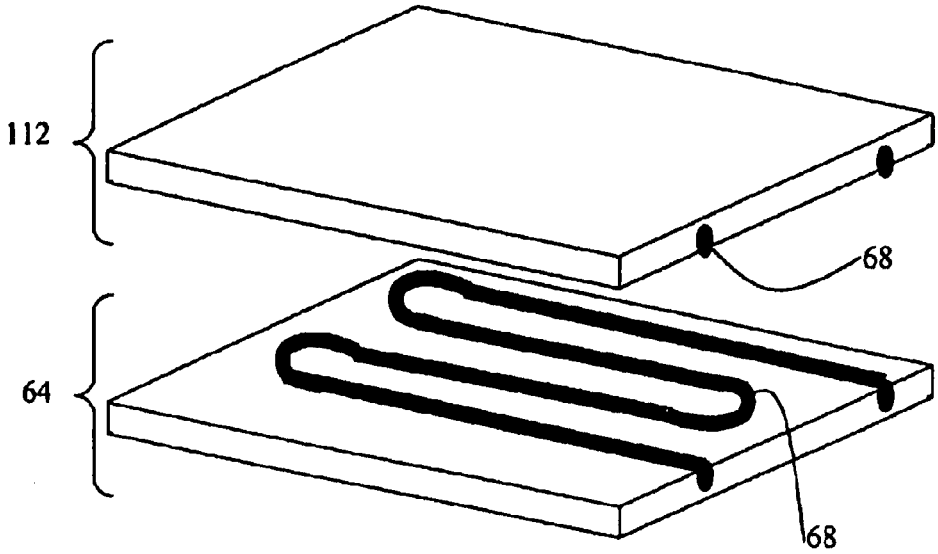
FIG. 13 is an exploded perspective view of a bi-level fuel cell layer structure with formed flowfields.

FIG. 13 shows an exploded cut-away view of a bi-level fuel cell layer structure showing formed flow fields 68 within the fuel cell layers. The seal is not shown in this figure to allow a better view of the formed flow fields 68. The formed flow fields can be created from a method selected from the group comprising: cutting, ablating, molding, embossing, etching, laminating, embedding, melting, and combinations thereof. The formed flow fields form a network of channels for controlling the distribution of reactant to the two fuel cell layers. Also, since the individual cells within each layer are oriented with their electrolyte and electrodes perpendicular to the surface of the layer it is possible to form the flow fields into the surface without significantly reducing the active area of the fuel cells and without modifying the overall structure of the fuel cell layer.

Figure 14:
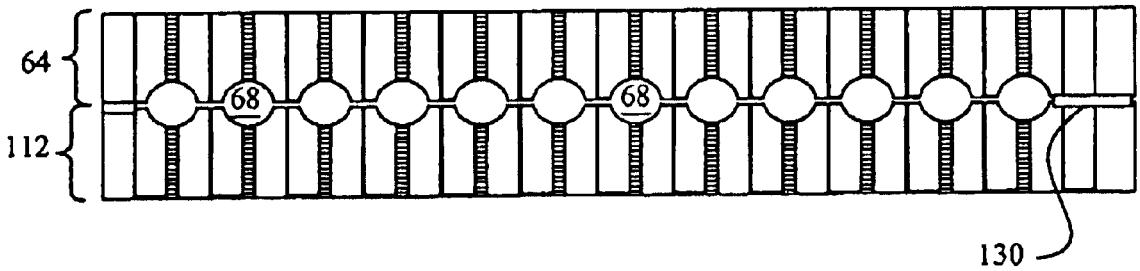
FIG. 14 is a cross-sectional view of yet another bi-level fuel cell structure.

FIG. 14 shows a cross section of a bi-level fuel cell layer structure with the seal 130 being as thin as possible to bring the fuel cell layers into physical but not electrical contact. Formed flow fields 68 are shown in the surface of the fuel cell layers to allow reactants to be delivered to the cell. The flow field 68 can take any path over the surface of the fuel cell layers, providing a single path from an inlet to an outlet, multiple parallel paths from inlet to outlet or single or multiple paths from an inlet to a dead-end. The formed flow fields can be disposed in the cathode or the anode side of the fuel cell layers.

Figure 15:
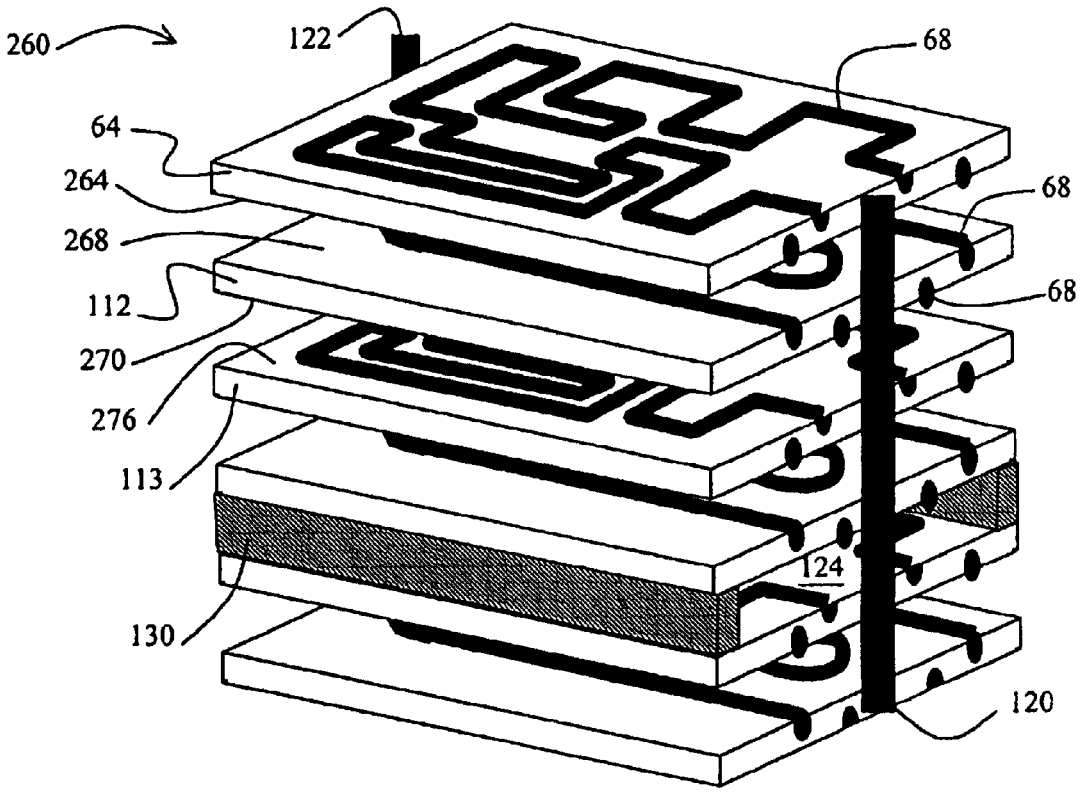
FIG. 15 is a perspective view of a multiple fuel cell layer structure.

FIG. 15 shows a multiple fuel cell layer structure 260. In this structure a first fuel cell layer 64 is stacked on a second fuel cell layer 112 such that the anode side 264 of the first fuel cell layer 64 and the anode side 268 of the second fuel cell layer 112 adjoin. A third fuel cell layer 113 cathode side 276 adjoins the cathode side 270 of the second fuel cell layer 112 forming a stack with adjacent fuel cell layers. Additional layers can be disposed on the first, second and third fuel cell layers in a like manner. At least one seal 130 is disposed between adjacent fuel cell layers forming at least one plenum 124. A positive connector 120 and a negative connector 122 are shown for connecting the stack to an outside load allowing the current produced by the fuel cell layers to power an external load.

Figure 15A:
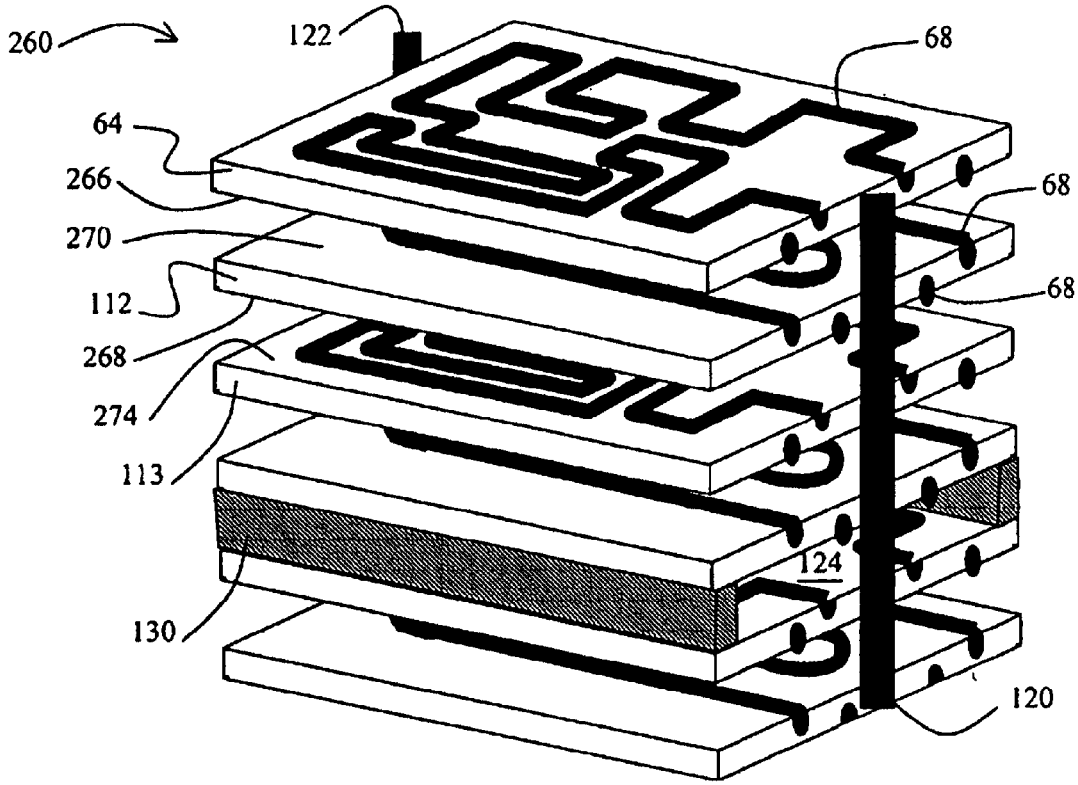
FIG. 15a is a perspective view of another multiple fuel cell layer structure.

FIG. 15a shows another embodiment of a multiple fuel cell layer structure 260. In this structure a first fuel cell layer 64 is stacked on a second fuel cell layer 112 such that the cathode side 266 of the first fuel cell layer 64 and the cathode side 270 of the second fuel cell layer 112 adjoin. A third fuel cell layer 113 anode side 274 adjoins the anode side 268 of the second fuel cell layer 112. Additional layers can be disposed on the first, second and third fuel cell layers in a like manner. At least one seal 130 is disposed between two adjacent fuel cell layers forming at least one plenum 124. A positive connector 120 and a negative connector 122 are shown for connecting the stack to an outside load allowing the current produced by the fuel cell layers to power an external load.

In both the FIG. 15 and the FIG. 15a embodiments the optional formed flow fields are shown on the fuel cell layers. Alternately, the at least one plenum created by the at least one seal can be solid with a flow field. The plenum can also comprise a permeable material. At least one of the at least one plenums may be open to the ambient environment. The fuel cell layers of the multiple fuel cell structure can be connected in series, in parallel, or in combination thereof between the positive and negative electrical connectors.

In the foregoing paragraphs a method of forming a fuel cell layer structure by electrically connecting multiple fuel cell layers in parallel and by forming reactant distribution flow fields within the individual fuel cell layers has been described. This configuration achieves the functionality of a conventional stack structure without the requirement for any explicit multi-function or bipolar separator plate to be inserted between discrete fuel cells or fuel cell layers resulting in an overall more space and material efficient design. Furthermore, since there is no current flow between neighbouring fuel cell layers the task of sealing and connecting the fuel cell layers into the stack is simplified considerably. Forming the flow fields on the surface of the fuel cell layers allows the reactant distribution flow paths to be formed without significantly decreasing the total reactive area of the fuel cell stack in comparison to an embodiment constructed without the embossed flow fields. Extra volume for separate bipolar plates, separators, etc. is not required with this configuration providing an overall increase in the volumetric power density of the fuel cell stack.

Although various materials could be used for the porous substrate of the invention, one usable material could be a conductive material. Materials such as a metal foam, graphite, graphite composite, at least one silicon wafer, sintered polytetrafluoroethylene, crystalline polymers, composites of crystalline polymers, reinforced phenolic resin, carbon cloth, carbon foam, carbon aerogel, ceramic, ceramic composites, composites of carbon and polymers, ceramic and glass composites, recycled organic materials, and combinations thereof are contemplated as usable in this invention.

The channel is contemplated to have up to 50 optional support members separating the walls of the channel. The support members can be located at the extreme ends of the channel, such as forming a top or bottom, or can be located in the middle portion of the channel, or be oriented at an angle to the center of the channel. It is contemplated that the support member can be an insulating material. If an insulating material is used, it is contemplated that silicon, graphite, graphite composite, polytetrafluoroethylene, polymethamethacrylate, crystalline polymers, crystalline copolymers, cross-linked polymers thereof, wood, and combinations thereof can be usable in the invention.

Dimensionally, the channel can have a dimension ranging from 1 nanometer to 10 cm in height, 1 nanometer to 1 mm in width and from 1 nanometer to 100 meters in length.

A single fuel cell of the invention, optionally within a fuel cell layer, is contemplated of being capable of producing between approximately 0.25 volts and approximately 4 volts. Between 1 and 5000 fuel cells are contemplated as usable in one fuel cell layer in this design, however in a preferred embodiment, the fuel cell layer has between 75 and 150 joined fuel cells. This fuel cell layer is contemplated to be capable of producing a voltage between 0.25 volts and 2500 volts. A fuel cell with more channels will be capable of producing higher voltages.

The invention can be constructed such that the fuel comprises a member of the group: pure hydrogen, gas containing hydrogen, formic acid, an aqueous solution comprising a member of the group: ammonia, methanol, ethanol and sodium borohydride, and combinations thereof. The invention can be constructed such that the oxidant comprises a member of the group: pure oxygen, gas containing oxygen, air, oxygen enriched air, and combinations thereof.

Electrolyte usable in this invention can be a gel, a liquid or a solid material. Various materials are contemplated as usable and include: a perfluoronated polymer containing sulphonic groups, an aqueous acidic solution having a pH of at most 4, an aqueous alkaline solution having a pH greater than 7, and combinations thereof. Additionally, it is contemplated that the electrolyte layer can be between 1 nanometer and 1.0 mm in thickness, or alternatively simply filling each undulating channel from first wall to second wall without a gap.

The fuel cell is manufactured using a first and second coating on the porous substrate. These coatings can be the same material or different materials. At least one of the coatings can comprise a member of the group: polymer coating, epoxies, polytetrafluoro ethylene, polymethyl methacrylate, polyethylene, polypropylene, polybutylene, and copolymers thereof, cross-linked polymers thereof, conductive metal, and combinations thereof. Alternatively, the first or second coating can comprise a thin metallic layer such as a coating of gold, platinum, aluminum or tin as well as alloys of these or other metals or metallic combinations.

The first and second catalyst layers that are contemplated as usable in the invention can be a noble metal, alloys comprising noble metals, platinum, alloys of platinum, ruthenium, alloys of ruthenium, and combinations of these materials. It is contemplated that ternary alloys having at least one noble metal are usable for good voltage creation. Platinum-ruthenium alloys are also contemplated as usable in this invention. The catalyst layers should each have a catalyst loading quantity wherein the amount of catalyst may be different for each layer.

The material for the optional sealant barriers contemplated herein can be selected from the group comprising: silicon, epoxy, polypropylene, polyethylene, polybutylene, and copolymers thereof, composites thereof, and combinations thereof.

One method for making the fuel cell contemplates the following steps:

a. forming a porous substrate having a top and bottom having a first side and a second side;

b. coating at least a portion of the top with a first coating;

c. coating at least a portion of the bottom with a second coating;

d. forming a channel using the porous substrate, wherein the channel comprises a first channel wall and a second channel wall;

e. forming an anode by depositing a first catalyst layer on the first channel wall;

f. forming a cathode by depositing a second catalyst layer in the second channel wall;

g. disposing electrolyte in at least a portion of the channel contacting the anode and the cathode;

h. attaching a positive electrical connection on one end to the first side of the porous substrate, and attaching a negative electrical connection on one end to the second side of the porous substrate;

i. attaching a fuel plenum to the porous substrate forming a fuel cell;

j. attaching an oxidant plenum to the porous substrate;

k. disposing a sealant barrier around at least a portion of the fuel cell; and l. loading the fuel plenum with fuel and the oxidant plenum with oxidant.

The sequence of operations described may be varied and steps combined as required to suit the particular material requirements and fabrication processes used. As well, the method can comprise forming between one and 250 or more channels in the porous substrate.

Another method for forming a fuel cell envisioned in the invention contemplates the following steps:

a. repeating steps a through h of the method above as many times as needed prior to joining the porous substrate to the fuel plenum forming at least one additional fuel cell;

b. securing the porous substrate at the sealant barriers to at least on additional fuel cell at its sealant barrier forming a fuel cell layer and extending the fuel cell layer securing additional formed fuel cells to the fuel cell layer at respective sealant barriers;

c. attaching the positive electrical connections and the negative electrical connections of the fuel cell layer together;

d. attaching the joined fuel cells to the fuel plenum; and e. attaching the joined fuel cells to the oxidant plenum.

The positive electrical connections and the negative electrical connections of the fuel cells within the fuel cell layer can be connected in series, in parallel or in a combination of series and parallel.

Yet another method for making a fuel cell layer is contemplated which has the steps of:

a. forming a porous substrate comprising a top and bottom, a first side and a second side;

b. coating at least a portion of the top with a first coating;

c. coating at least a portion of the bottom with a second coating;

d. forming a plurality of distinct channels using the porous substrate, wherein each distinct channel comprises a first channel wall and a second channel wall;

e. forming a plurality of anodes by depositing a plurality of first catalyst layers on the first channel walls;

f. forming a plurality of cathodes by depositing a plurality of second catalyst layers in the second channel walls;

g. disposing electrolyte in at least a portion of each distinct channel;

h. disposing a first sealant barrier on at least a portion of the first side;

i. disposing a second sealant barrier on at least a portion of the second side;

j. forming a plurality of third sealant barriers between each of the distinct channels creating a plurality of independent fuel cells adjacent each other in the porous substrate;

k. attaching a positive electrical connection to the first side of the porous substrate;

l. attaching a negative electrical connection to the second side of the porous substrate;

m. attaching a fuel cell positive electrical connection to each independent fuel cells n. attaching a fuel cell negative electrical connection to each independent fuel cell forming a fuel cell layer; and o. disposing a sealant barrier around at least a portion of the fuel cell layer.

In any of the methods described above a number of different methods of forming the porous substrate are contemplated herein. The porous substrate can be formed by a method that is a member of the group comprising: casting and then baking, slicing layers from a pre-formed brick, molding, extruding, and combinations thereof. The formed porous substrate may be non-planar or enclose a volume.

If at least one of the coatings is deposited with thin film deposition techniques, the technique may include a member of the group comprising: sputtering, electroless plating, electroplating, soldering, physical vapor deposition, chemical vapor deposition. If at least one of the coatings is an epoxy coating the coating can be disposed on the substrate by a method selected from the group: screen printing, ink jet printing, spreading with a spatula, spray gun deposition, vacuum bagging and combinations thereof. A mask can be used when applying the coatings to the porous substrate. If required, a portion of the coating can be removed prior to adding the electrolyte.

The channel can be formed in the porous substrate by a method selected from the group comprising: embossing, ablating, etching, extruding, laminating, embedding, melting, molding, cutting, and combinations thereof. If etching is used, the etching can be by a method selected from the group comprising: laser etching, deep reactive ion etching, and alkaline etching. Alternatively, it is anticipated the channels can be formed by micro-milling using laser cutting, high pressure water jets, micro-dimensioned rotary tools or mechanical dicing saws.

Within the invention it is envisioned to deposit the electrolyte in the channel using a method that is a member of the group comprising: pressure injection, vacuum forming, hot embossing, and combinations thereof.

The variations for making the apparatus can be implemented into any of the methods described above. For example, the method can contemplate using a conductive material for the sealant barrier and/or an insulation material for the support member.

The fuel cell of the invention can be used by first, connecting a fuel source to a fuel plenum inlet; second, connecting a fuel plenum outlet to a re-circulating controller; third, connecting an oxidant plenum inlet to an oxidant source; fourth, connecting an oxidant plenum outlet to a flow control system, fifth, connecting a positive electrical connection and a negative electrical connection to an external load; sixth, flowing fuel and oxidant to the inlets; and finally, driving load with electricity produced by the fuel cell.

If a dead-ended version of the fuel cell is used the operation is much simpler. First, the fuel inlet is connected to a fuel supply, second, the oxidant inlet is connected to an oxidant supply, third, the positive electrical connection and the negative electrical connection are connected to an external load; and finally, the load is driven with electricity produced by the fuel cell.

The method of the invention can further comprise the step of sealing the plenum outlets and inlets after the fuel and oxidant is loaded into their respective plenums creating a dead ended fuel cell. The fuel cell can then be connected to an external load using the positive and negative electrical connections and used to drive the external load.

It is envisioned within this invention to use any combination of fuel and oxidant inlets and outlets to operate the fuel cell.

The invention has been described in detail with particular reference to certain preferred embodiments thereof, but it will be understood that variations and modifications can be effected within the scope of the invention.

What is claimed is:

1. A multiple fuel cell layer structure comprising:

a. a plurality of layers of fuel cells, each layer of fuel cells comprising an anode side and a cathode side, a positive end and a negative end, and wherein a first layer of fuel cells is stacked on top of a second layer of fuel cells such that the anode side of the first layer of fuel cells and the anode side of the second layer of fuel cells adjoin, a third layer of fuel cells is stacked on the second layer of fuel cells such that the third layer of fuel cells cathode side adjoins the second layer of fuel cells cathode side forming a stack with adjacent layers of fuel cells, additional layers of fuel cells can then be disposed on said first, second, and third layers of fuel cells in a like manner;

b. at least one seal disposed between said adjacent layers of fuel cells forming at least one plenum;

c. a positive connector for said stack to an outside load; and d. a negative connector for connecting said stack to said outside load; such that when fuel is presented to the anode sides of the plurality of said layers, and oxidant is presented to the cathode sides of the plurality of said layers current is produced to drive said outside load.

2. The multiple fuel cell layer structure of claim 1, wherein said at least one plenum is a member of the group: fuel plenum, an oxidant plenum and combinations thereof.

3. The multiple fuel cell layer structure of claim 1, wherein said at least one plenum is a permeable material.

4. The multiple fuel cell layer structure of claim 1, wherein said at least one plenum is a solid material with a flow field.

5. The multiple fuel cell layer structure of claim 1, wherein said at least one plenum is open to an ambient environment.

6. The multiple fuel cell layer structure of claim 1, wherein said positive and negative ends are connected in series between the positive and negative connectors.

7. The multiple fuel cell layer structure of claim 1, wherein said positive ends and negative ends are connected in parallel to the positive and negative connectors.

8. The multiple fuel cell layer structure of claim 1, wherein said positive ends and said negative ends are connected in a combination of in series and in parallel between the positive and negative connectors.

9. A multiple fuel cell layer structure comprising:

a. a plurality of layers of fuel cells, each layer of fuel cells comprising an anode side and a cathode side, a positive end and a negative end, and wherein a first layer of fuel cells is stacked on top of a second layer of fuel cells such that the anode side of the first layer of fuel cells and the anode side of the second layer of fuel cells adjoin, a third layer of fuel cells is stacked on the second layer of fuel cells such that the third layer of fuel cells cathode side adjoins the second layer of fuel cells cathode side forming a stack with adjacent layers of fuel cells, additional layers of fuel cells can then be disposed on said first, second and third layers of fuel cells in a like manner;

b. at least one seal disposed between said adjacent layers of fuel cells forming at least one plenum;

c. at least one flowfield is formed in at least one of said layer of said stack;

d. a positive connector for connecting said stack to an outside load; and e. a negative connector for connecting said stack to said outside load; such that when fuel is presented to the anode sides of the plurality of layers of fuel cells, and oxidant is presented to the cathode sides of the plurality of layers of fuel cells current is produced to drive said outside load.

10. The multiple fuel cell layer structure of claim 9, wherein said at least one plenum is a member of the group consisting of fuel plenum, an oxidant plenum and combinations thereof.

11. The multiple fuel cell layer structure of claim 9, wherein said at least one plenum is a permeable material.

12. The multiple fuel cell layer structure of claim 9, wherein said at least one plenum is a solid material with a flow field.

13. The multiple fuel cell layer structure of claim 9, wherein said at least one plenum is open to an ambient environment.

14. The multiple fuel cell layer structure of claim 9, wherein said positive and negative ends are connected in series between the positive and negative connectors.

15. The multiple fuel cell layer structure of claim 9, wherein said positive ends and negative ends are connected in parallel to the positive and negative connectors.

16. The multiple fuel cell layer structure of claim 9, wherein said positive ends and said negative ends are connected in a combination of in series and in parallel between the positive and negative connectors.

17. The multiple fuel cell layer structure of claim 9, wherein said flowfield is formed by a method selected from the group consisting of cutting, ablating, molding, embossing, etching, laminating, embedding, melting and combinations thereof.

18. A bi-level fuel cell layer structure comprising:

a. a first fuel cell layer and a second fuel cell [layers] *layer*, each fuel cell layer operating with diffusion of reactant from an anode side to a cathode side, and further comprising, a positive end and a negative end, and wherein said first fuel cell layer is stacked on top of said second fuel cell layer such that the anode side of the first fuel cell layer and the anode side of the second fuel cell layer adjoin forming a bi-level stack;

b. a seal disposed between said first and second fuel cell layers forming a fuel plenum;

c. a positive connector for connecting said bi-level stack to an outside load; and d. a negative connector for connecting said bi-level stack to said outside load; such that when fuel is introduced to the fuel plenum and the cathode sides are exposed to an oxidant, current is produced to drive said outside load.

19. The bi-level fuel cell layer structure of claim 18, wherein said fuel plenum is a permeable material.

20. The bi-level fuel cell layer structure of claim 18, wherein said fuel plenum is a solid material with a flow field.

21. The bi-level fuel cell layer structure of claim 18, wherein said fuel plenum is open to an ambient environment.

22. The bi-level fuel cell layer structure of claim 18, wherein said positive and negative ends are connected in series between the positive and negative connectors.

23. The bi-level fuel cell layer structure of claim 18, wherein said positive ends and negative ends are connected in parallel to the positive and negative connectors.

24. The bi-level fuel cell layer structure of claim 18, wherein said fuel plenum comprises a volume comprising a hydrogen storage material.

25. The bi-level fuel cell layer structure of claim 18, further comprising at least one flowfield formed in at least one fuel cell layer.

26. The bi-level fuel cell layer structure of claim 25, wherein said flowfield is formed by a method selected from the group consisting of cutting, ablating, molding, embossing, etching, laminating, embedding, melting and combinations thereof.

27. A bi-level fuel cell layer structure comprising:

a [cell] *first* layer of fuel cells and a second layer of fuel cells, each fuel cell comprising an anode side and a cathode side, a positive end and a negative end, and wherein said first fuel cell layer is stacked on top of said second fuel cell layer such that the cathode side of the first fuel cell layer and the cathode side of the second fuel cell layer adjoin forming a bi-level stack;

a seal disposed between said first and second fuel cell layer forming a oxidant plenum;

a positive connector for connecting said bi-level stack to an outside load; and a negative connector for connecting said bi-level stack to said outside load; such that when oxidant is introduced to the oxidant plenum and the anode sides are exposed to a fuel, current is produced to drive said outside load.

28. The bi-level fuel cell layer structure of claim 27, wherein said oxidant plenum is a permeable material.

29. The bi-level fuel cell layer structure of claim 27, wherein said oxidant plenum is a solid material with a flow field.

30. The bi-level fuel cell layer structure of claim 27, wherein said oxidant plenum is open to an ambient environment.

31. The bi-level fuel cell layer structure of claim 27, wherein said positive and negative ends are connected in series between the positive and negative connectors.

32. The bi-level fuel cell layer structure of claim 27, wherein said positive ends and negative ends are connected in parallel to the positive and negative connectors.

33. The bi-level fuel cell layer structure of claim 27, further comprising at least one flowfield formed in at least one fuel cell layer.

34. The bi-level fuel cell layer structure of claim 33, wherein said flowfield is formed by a method selected from the group consisting of cutting, ablating, molding, embossing, etching, laminating, embedding, melting and combinations thereof.

*35. A bi-level fuel cell layer structure, comprising:*

*a first fuel cell layer and a second fuel cell layer, each fuel cell layer comprising:*

*a plurality of fuel cell units comprising:*

*an electrolyte disposed in a channel formed in a substrate;*

*one or more conductive sealant barriers, positioned to provide gas impermeable separation between adjacent fuel cell units;*

*a first coating, in contact with the electrolyte and the one or more conductive sealant barriers;*

*a second coating, in contact with the electrolyte and the one or more conductive sealant barriers;*

*a positive end and a negative end;*

*a seal in contact with the first fuel cell layer and second fuel cell layer and positioned to form a reactant plenum;*

*a positive connector and negative connector, each in contact with an outside load;*

*wherein the first fuel cell layer and second fuel cell layer are in contact such that the reactant plenum is utilized by like coatings of each fuel cell layer and wherein the negative ends of each fuel cell layer are in electrical contact sufficient to form a bi-level structure.*

*36. The bi-level fuel cell layer structure of claim 35, wherein the first and second coatings comprise thin metallic layers.*

*37. The bi-level fuel cell layer structure of claim 35, wherein the first and second coatings comprise platinum.*

*38. The bi-level fuel cell layer structure of claim 35, further comprising a conductive substrate positioned between adjacent fuel cell units to facilitate a current flow between the fuel cell units.*

*39. The bi-level fuel cell layer structure of claim 35, further comprising a fuel within the reactant plenum.*

*40. The bi-level fuel cell layer structure of claim 39, wherein the fuel comprises hydrogen.*

*41. The bi-level fuel cell layer structure of claim 35, further comprising an oxidant within the reactant plenum.*

*42. A bi-level fuel cell layer structure, comprising:*

*a first fuel cell layer and a second fuel cell layer, each fuel cell layer comprising:*

*a plurality of fuel cell units, each said fuel cell unit comprising:*

*a substrate having a channel formed therein, the channel defined by first and second walls;*

*an electrolyte disposed in the channel;*

*a first catalyst layer disposed on the first wall;*

*a second catalyst layer disposed on the second wall;*

*one or more conductive sealant barriers positioned to provide gas impermeable separation between adjacent fuel cell units;*

*a positive end and a negative end;*

*a seal in contact with the first fuel cell layer and second fuel cell layer and positioned to form a reactant plenum;*

*a positive connector and negative connector, each in contact with an outside load;*

*wherein the first fuel cell layer and second fuel cell layer are in contact such that the reactant plenum is utilized by like catalyst layers of each fuel cell layer and wherein the negative ends of each fuel cell layer are in electrical contact sufficient to form a bi-level structure.*

*43. The bi-level fuel cell layer structure of claim 42, wherein the first and second catalyst layers comprise thin metallic layers.*

*44. The bi-level fuel cell layer structure of claim 42, wherein the first and second catalyst layers comprise platinum.*

*45. The bi-level fuel cell layer structure of claim 42, further comprising a fuel within the reactant plenum.*

*46. The bi-level fuel cell layer structure of claim 42, wherein the fuel comprises hydrogen.*

*47. The bi-level fuel cell layer structure of claim 42, further comprising an oxidant within the reactant plenum.*

*48. The bi-level fuel cell layer structure of claim 42, further comprising a solid material with a flowfield within the reactant plenum.*

*49. The bi-level fuel cell layer structure of claim 42, wherein the reactant plenum is open to an ambient environment.*

*50. The bi-level fuel cell layer structure of claim 42, wherein the positive and negative ends of the fuel cell layers are connected in series between the positive and negative connectors.*

*51. The bi-level fuel cell layer structure of claim 42, wherein the positive ends and negative ends of the fuel cell layers are connected in parallel to the positive and negative connectors.*

*52. The bi-level fuel cell layer structure of claim 42, further comprising a hydrogen storage material within the reactant plenum.*

*53. The bi-level fuel cell layer structure of claim 42, further comprising at least one flowfield formed in at least one fuel cell layer.*

*54. The bi-level fuel cell layer structure of claim 53, wherein the flowfield is formed by a method selected from the group consisting of cutting, ablating, molding, embossing, etching, laminating, embedding, melting and combinations thereof.*

*55. A multiple layer fuel cell structure, comprising:*

*a first fuel cell layer and a second fuel cell layer, said first and second fuel cell layers arranged vertically with respect to one another, each fuel cell layer comprising:*

*a plurality of fuel cell units arranged laterally with respect to one another, each fuel cell unit comprising:*

*at least one substrate defining first and second walls in spaced relation to one another, the first and second walls defining a channel;*

*a first catalyst layer disposed on the first wall;*

*a second catalyst layer disposed on the second wall;*

*an electrolyte disposed in the channel between the first and second walls, whereby said first wall forms an anode and said second wall forms a cathode of said fuel cell unit;*

*at least one sealant barrier, at least one such sealant barrier placed between laterally adjacent fuel cell units, and configured to provide gas impermeable separation between such adjacent fuel cell units; and*

*a positive connector and negative connector, each configured for contacting an outside load;*

*a first enclosure configured to form a first reactant plenum, said first enclosure in fluid communication with each of said first and second vertically arranged fuel cell layers and further in fluid communication with each fuel cell unit in each said layer;*

*a first electrical connection formed connecting said positive connectors of said first and second fuel cell layers; and*

*a second electrical connection formed connecting said negative connectors of said first and second fuel cell layers.*

*56. The multiple layer fuel cell structure of claim 55, wherein said first enclosure is placed vertically between said first and second fuel cell layers.*

*57. The multiple layer fuel cell structure of claim 55, further comprising a second enclosure configured to form a second reactant plenum, said second enclosure in fluid communication with each of said first and second vertically arranged fuel cell layers and with each fuel cell unit in each said layer.*

*58. The multiple layer fuel cell structure of claim 55, wherein a plurality of fuel cell units within each fuel cell layer are electrically coupled in series within said layer.*

*59. A method of making a multiple level fuel cell structure, comprising the acts of:*

*forming a first fuel cell layer, comprising,*

*forming a plurality of fuel cell units, each fuel cell unit comprising a volume of electrolyte, and further comprising an anode and a cathode coupled to opposing sides of said volume of electrolyte;*

*forming a sealant barrier between each fuel cell unit and a laterally adjacent fuel cell unit; and*

*forming an electrical connection between each fuel cell unit and at least one adjacent fuel cell unit in said first fuel cell layer, comprising forming a connection between the anode of one such fuel cell unit and the cathode of the adjacent fuel cell unit;*

*forming a positive contact for said first fuel cell layer; and*

*forming a negative contact for said first fuel cell layer;*

*forming a second fuel cell layer, said second fuel cell layer vertically disposed relative to said first fuel cell layer, comprising,*

*forming a plurality of fuel cell units, each fuel cell unit comprising a volume of electrolyte, and further comprising an anode and a cathode coupled to opposing sides of said volume of electrolyte;*

*forming a sealant barrier between each fuel cell unit and a laterally adjacent fuel cell unit in said second fuel cell layer; and*

*forming an electrical connection between each fuel cell unit and at least one adjacent fuel cell unit in said second fuel cell layer, comprising forming a connection between the anode of one such fuel cell unit and the cathode of the adjacent fuel cell unit;*

*forming a positive contact for said second fuel cell layer; and*

*forming a negative contact for said second fuel cell layer;*

*forming a first reactant plenum, said reactant plenum in fluid communication with each fuel cell in said first and second fuel cell layers;*

*forming a first electrical connection between said positive contacts of said first and second fuel cell layers; and*

*forming a second electrical connection between said negative contacts of said first and second fuel cell layers.*

*60. The method of making a multiple level fuel cell structure of claim 59, wherein said first reactant plenum is placed vertically between said first and second fuel cell layers.*

*61. The method of making a multiple level fuel cell structure of claim 59, further comprising the act of forming a second reactant plenum, said reactant plenum in fluid communication with each fuel cell in said first and second fuel cell layers.*

*62. The method of claim 61, further comprising the acts of:*

*introducing a fuel into one of said first and second reactant plenums; and*

*introducing an oxidant into the other of said first and second reactant plenums.*

*63. A method of making a bi-level fuel cell layer structure, comprising the acts of:*

*forming first and second fuel cell layers, each fuel cell layer formed through acts comprising,*

*forming a substrate having a first side and second side;*

*coating at least a portion of the first side with a first coating;*

*coating at least a portion of the second side with a second coating;*

*forming a channel in the substrate, including a first channel wall and second channel wall;*

*forming an anode by depositing a first catalyst layer on the first channel wall;*

*forming a cathode by depositing a second catalyst layer on the second channel wall;*

*disposing electrolyte in at least a portion of the channel in contact with the anode and cathode;*

*contacting a positive electrical connection on one end to the first side of the substrate;*

*contacting a negative electrical connection on one end to the second side of the substrate, sufficient to form a fuel cell unit;*

*disposing a sealant barrier around at least a portion of the fuel cell unit;*

*forming a first reactant plenum; and*

*placing said first reactant plenum in contact with a first side of the first fuel cell layer and a first side of the second fuel cell layer, to form a bi-level structure wherein the first reactant plenum is utilized by like electrodes of the first fuel cell layer and second fuel cell layer.*

* * * * *

UNITED STATES PATENT AND TRADEMARK OFFICE

CERTIFICATE OF CORRECTION

PATENT NO. : RE 41,577 E
APPLICATION NO. : 11/998436
DATED : August 24, 2010
INVENTOR(S) : Gerard F. McLean It is certified that error appears in the above-identified patent and that said Letters Patent is hereby corrected as shown below:

In column 1, line 10, delete "BACKGROUND OF THE INVENTION" and insert -- CROSS-REFERENCE TO RELATED APPLICATION --, therefor.

In column 1, line 19, below "structure" insert -- BACKGROUND OF THE INVENTION --.

In column 3, line 23, delete "to" and insert -- on --, therefor.

In column 3, line 62, delete "reminescent" and insert -- reminiscent --, therefor.

In column 4, line 24, delete "cell" and insert -- cell layer --, therefor.

In column 6, line 21, delete "fuel" and insert -- fuel cell --, therefor.

In column 7, line 44, delete "membrane;" and insert -- substrate; --, therefor.

In column 8, line 5, delete "is" and insert -- as --, therefor.

In column 8, line 62, delete "preferably" and insert -- preferable --, therefor.

In column 10, line 27, delete "than" and insert -- then --, therefor.

In column 10, line 42, delete "of" and insert -- and --, therefor.

In column 11, line 16, delete "fell" and insert -- fuel --, therefor.

In column 11, line 35, delete "fractral" and insert -- fractal --, therefor.

In column 12, line 19, delete "cylinder" and insert -- cylindrical --, therefor.

In column 13, line 6, after "parallel." delete "p".

Signed and Sealed this

Thirtieth Day of November, 2010

David J. Kappos

David J. Kappos
*Director of the United States Patent and Trademark Office*

In column 13, lines 7-12, delete "FIG. 12a shows another embodiment of a bi-level fuel cell layer structure 255 but in this embodiment the fuel cell layers 64, 112 are place such that their cathode sides 266, 270 adjoin. In this embodiment oxidant is supplied to the oxidant plenum 125 formed by the seal 130 and fuel is supplied to the structure top 70 and bottom 72." and insert the same on Col. 13, Line 7 as a new paragraph.

In column 14, line 24, delete "combination" and insert -- combinations --, therefor.

In column 14, line 67, delete "polymethamethacrylate," and insert -- polymethylmethacrylate, --, therefor.

In column 17, line 13, delete "cells" and insert -- cells; --, therefor.

In column 20, lines 24-39, in Claim 27, delete "A bi-level fuel cell layer structure comprising:

a [cell] *first* layer of fuel cells and a second layer of fuel cells, each fuel cell comprising an anode side and a cathode side, a positive end and a negative end, and wherein said first fuel cell layer is stacked on top of said second fuel cell layer such that the cathode side of the first fuel cell layer and the cathode side of the second fuel cell layer adjoin forming a bi-level stack;

a seal disposed between said first and second fuel cell layer forming a oxidant plenum;

a positive connector for connecting said bi-level stack to an outside load; and a negative connector for connecting said bi-level stack to said outside load; such that when oxidant is introduced to the oxidant plenum and the anode sides are exposed to a fuel, current is produced to drive said outside load."

and insert -- A bi-level fuel cell layer structure comprising:

a. a [cell] *first* layer of fuel cells and a second layer of fuel cells, each layer of fuel cells comprising an anode side and a cathode side, a positive end and a negative end, and wherein said first layer of fuel cells is stacked on top of said second layer of fuel cells such that the cathode side of the first layer of fuel cells and the cathode side of the second layer of fuel cells adjoin forming a bi-level stack;

b. a seal disposed between said first and second layers of fuel cells forming a oxidant plenum;

c. a positive connector for connecting said bi-level stack to an outside load; and d. a negative connector for connecting said bi-level stack to said outside load; such that when oxidant is introduced to the oxidant plenum and the anode sides are exposed to a fuel, current is produced to drive said outside load. --, therefor.